United States Patent
Nanba

(10) Patent No.: US 8,792,181 B2
(45) Date of Patent: Jul. 29, 2014

(54) ZOOM LENS AND IMAGE PICKUP APPARATUS INCLUDING THE SAME

(71) Applicant: Canon Kabushiki Kaisha, Tokyo (JP)

(72) Inventor: Norihiro Nanba, Utsunomiya-shi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/653,289

(22) Filed: Oct. 16, 2012

(65) Prior Publication Data

US 2013/0100335 A1    Apr. 25, 2013

(30) Foreign Application Priority Data

Oct. 21, 2011 (JP) ................................. 2011-231339

(51) Int. Cl.
*G02B 15/14* (2006.01)
(52) U.S. Cl.
USPC .......... 359/676; 359/683; 359/684; 359/685; 359/686; 359/714; 359/740; 359/766
(58) Field of Classification Search
USPC .................. 359/676, 683–686, 714, 740, 766
See application file for complete search history.

(56) References Cited

U.S. PATENT DOCUMENTS

| 6,404,561 | B1 | 6/2002 | Isono | |
|---|---|---|---|---|
| 7,177,092 | B2 | 2/2007 | Satori | |
| 7,830,612 | B2 * | 11/2010 | Hagiwara | 359/766 |
| 7,982,967 | B2 * | 7/2011 | Fujisaki | 359/683 |
| 2010/0220398 | A1 * | 9/2010 | Ohtake | 359/683 |
| 2011/0032402 | A1 * | 2/2011 | Nanba | 359/683 |
| 2011/0032625 | A1 * | 2/2011 | Saito | 359/683 |
| 2011/0080650 | A1 * | 4/2011 | Nanba | 359/683 |
| 2011/0080653 | A1 * | 4/2011 | Kimura | 359/683 |
| 2011/0085248 | A1 * | 4/2011 | Ohtake et al. | 359/683 |
| 2011/0141577 | A1 * | 6/2011 | Kimura | 359/683 |
| 2012/0087017 | A1 * | 4/2012 | Fujisaki | 359/687 |
| 2012/0287312 | A1 * | 11/2012 | Kimura | 359/683 |

FOREIGN PATENT DOCUMENTS

| JP | 2007-219040 | A | 8/2007 |
|---|---|---|---|
| JP | 2009-115958 | A | 5/2009 |
| JP | 2009-282398 | A | 12/2009 |
| JP | 2011-033868 | A | 2/2011 |
| JP | 2011-075985 | A | 4/2011 |
| JP | 2013-044755 | A | 3/2013 |

* cited by examiner

*Primary Examiner* — Evelyn A. Lester
(74) *Attorney, Agent, or Firm* — Canon USA Inc IP Division

(57) ABSTRACT

A zoom lens includes, in order from an object side to an image side, first to fifth lens units respectively having positive, negative, positive, negative, and positive refractive powers. During zooming from a wide-angle end to a telephoto end, each of the lens units moves in such a way that a distance between the first and second lens units increases, a distance between the second and third lens units decreases, a distance between the third and fourth lens units increases, and a distance between the fourth and fifth lens units increases. The distances D34w and D34t between the third and fourth lens units, the distances D45w and D45t between the fourth and fifth lens units, focal lengths fw and ft of the entire zoom lens, and focal lengths f1 and f4 of the first and fourth lens units are appropriately set.

11 Claims, 17 Drawing Sheets

WIDE-ANGLE END

MIDDLE

TELEPHOTO END

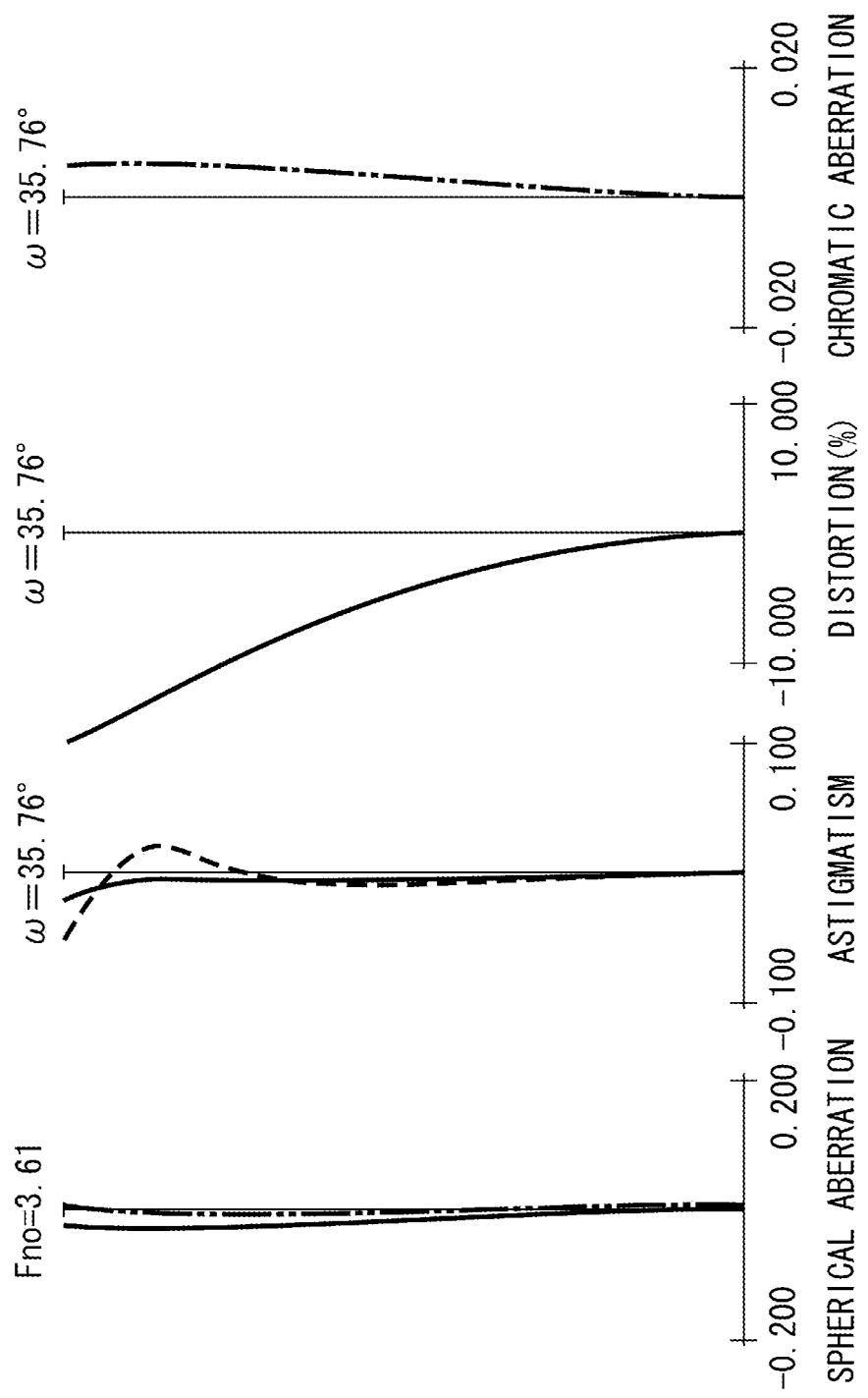

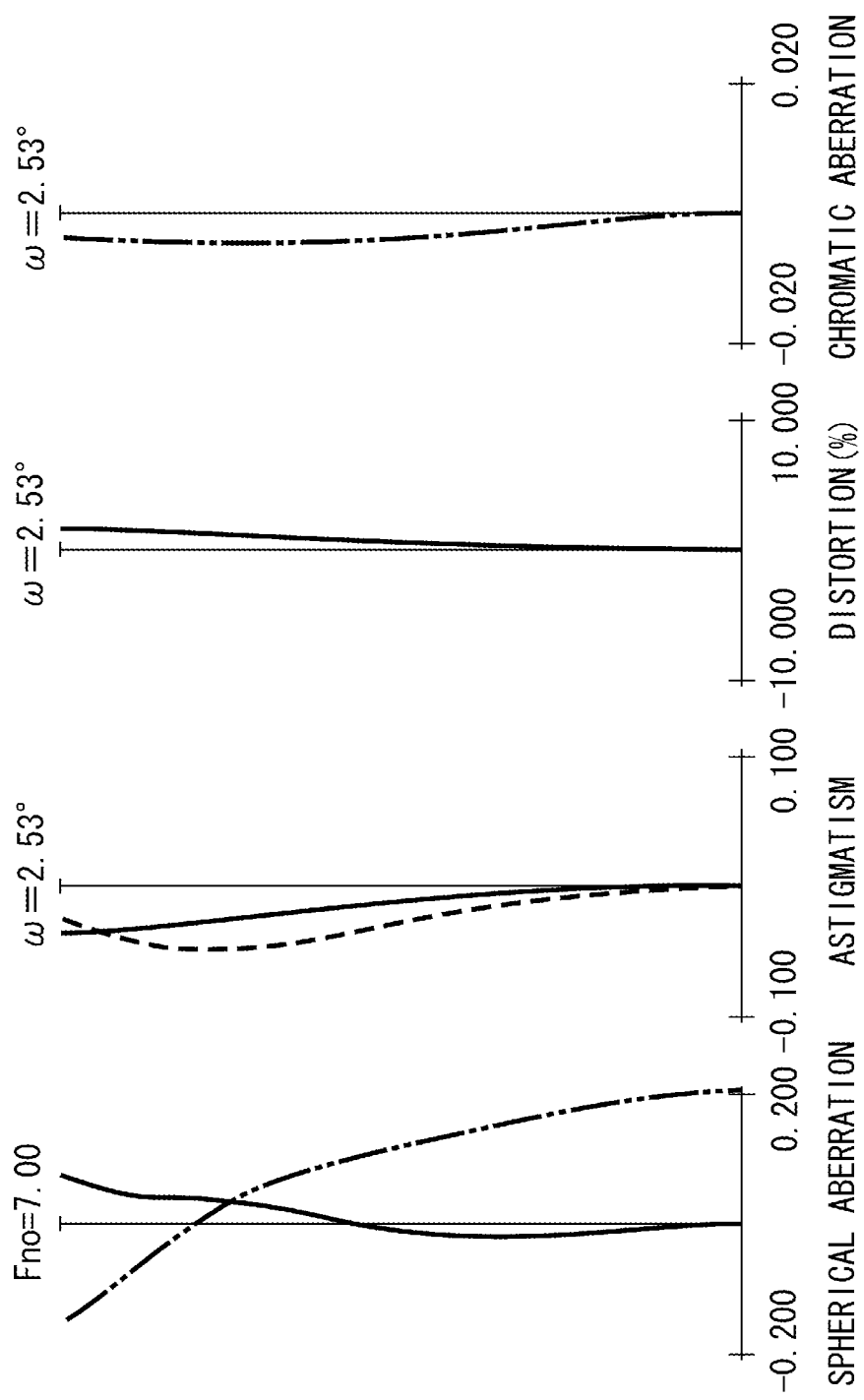

WIDE-ANGLE END

MIDDLE

TELEPHOTO END

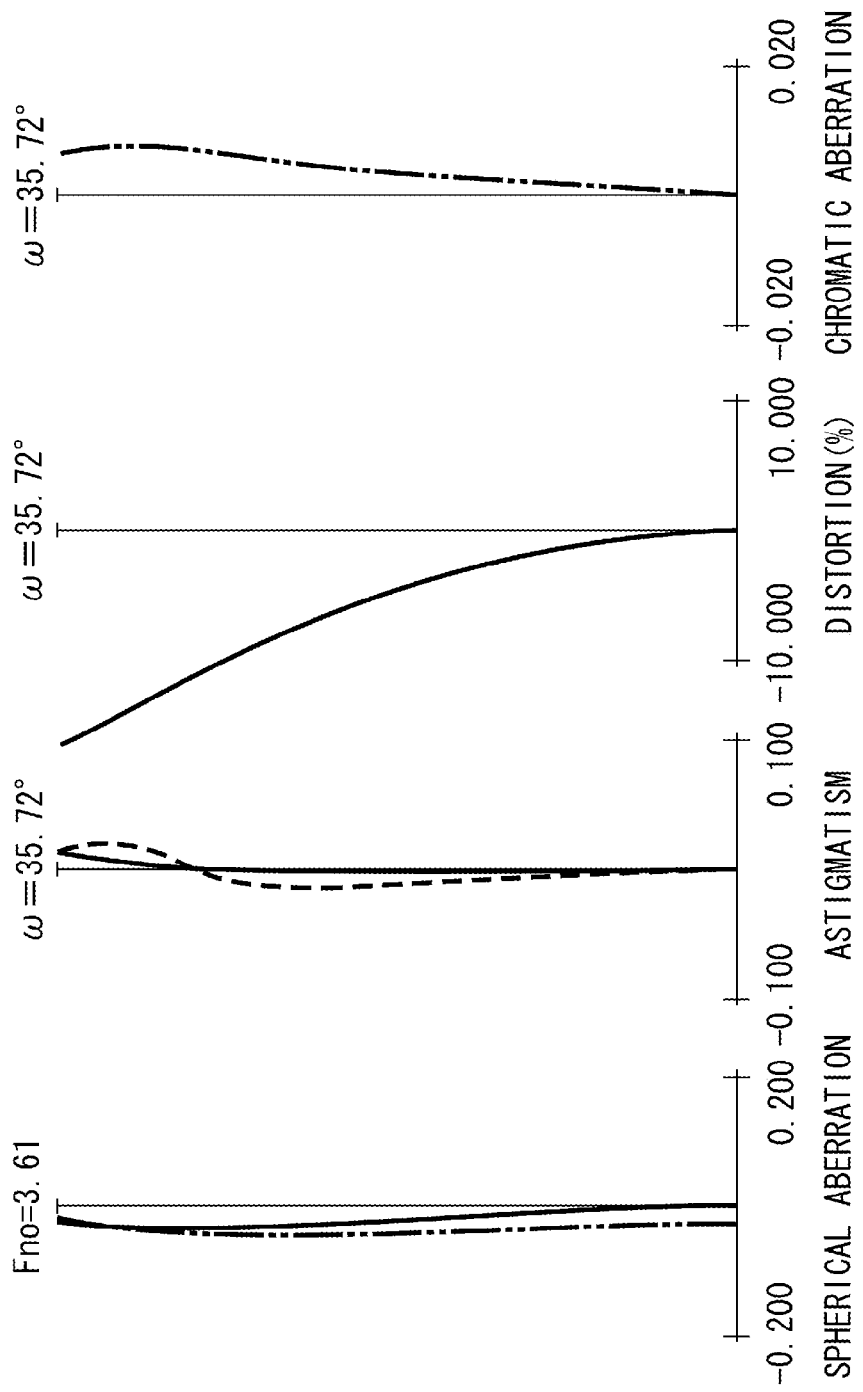

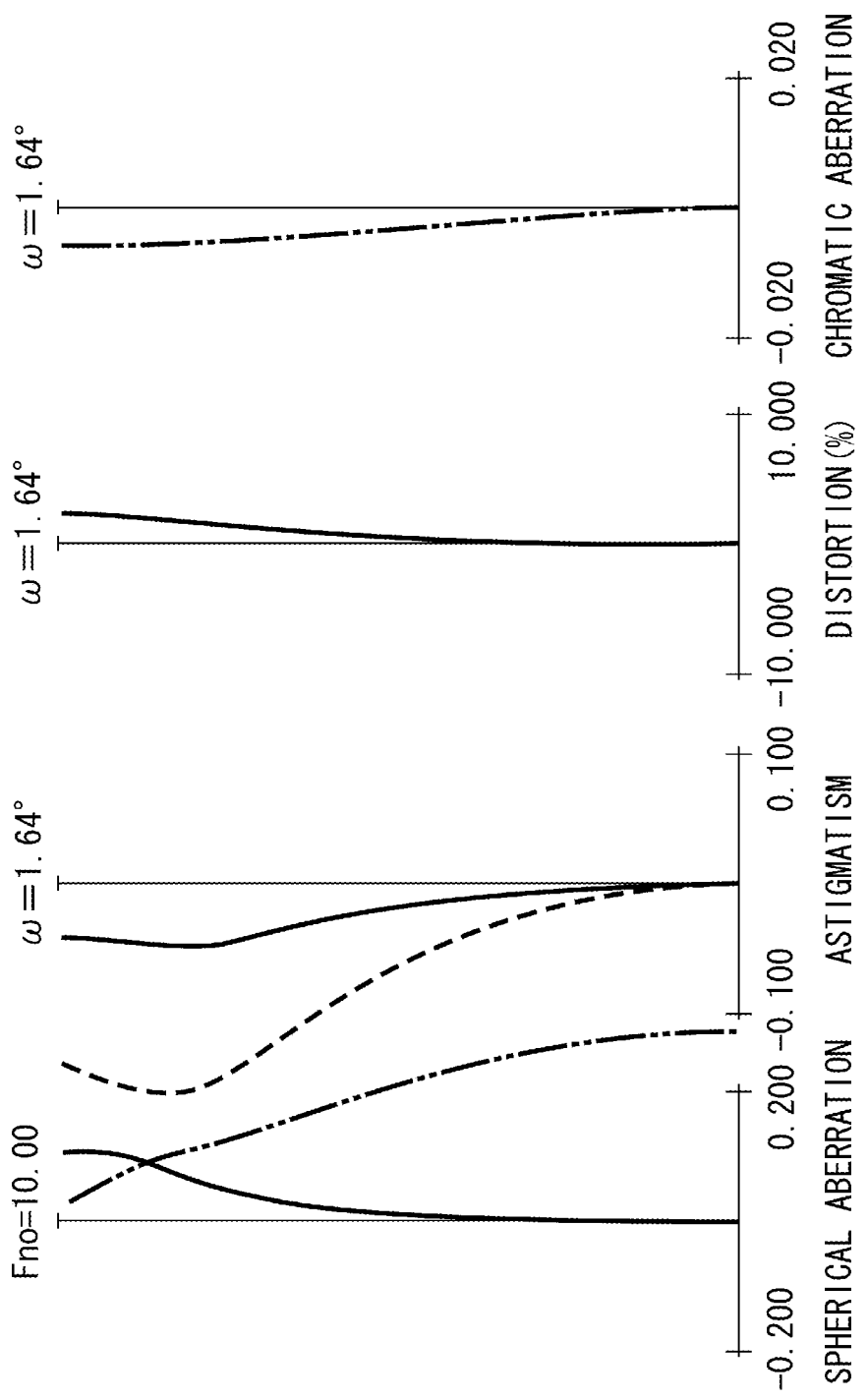

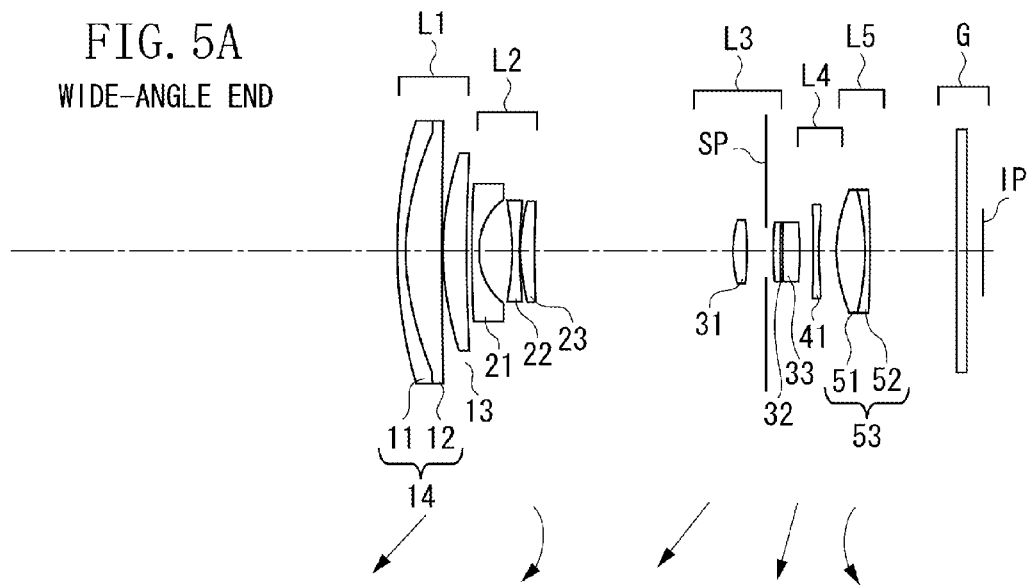
FIG. 5A WIDE-ANGLE END
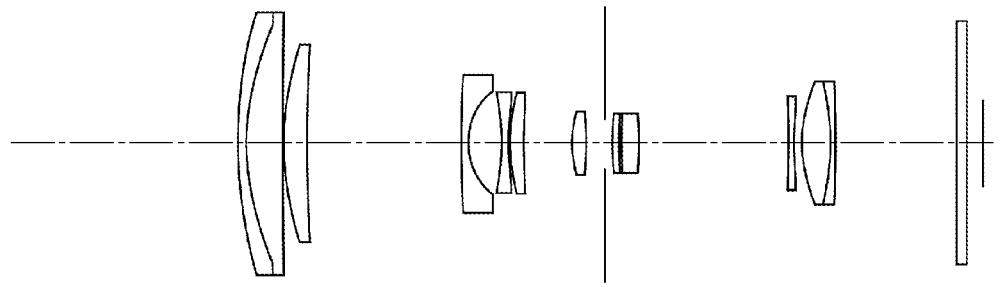
FIG. 5B MIDDLE
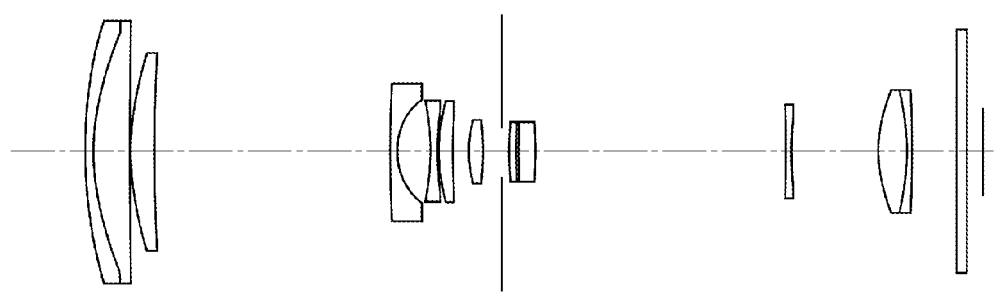
FIG. 5C TELEPHOTO END

WIDE-ANGLE END

MIDDLE

TELEPHOTO END

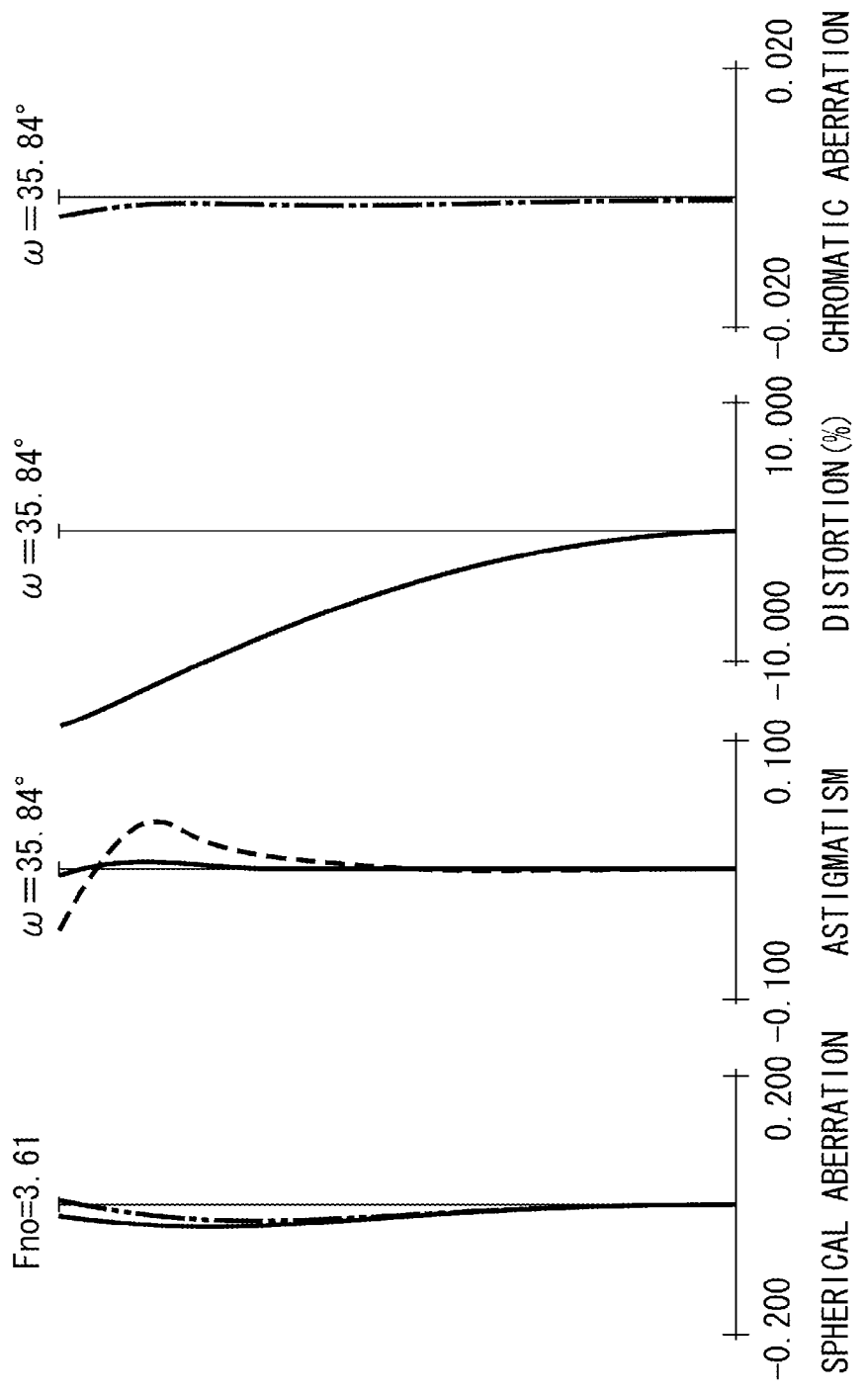

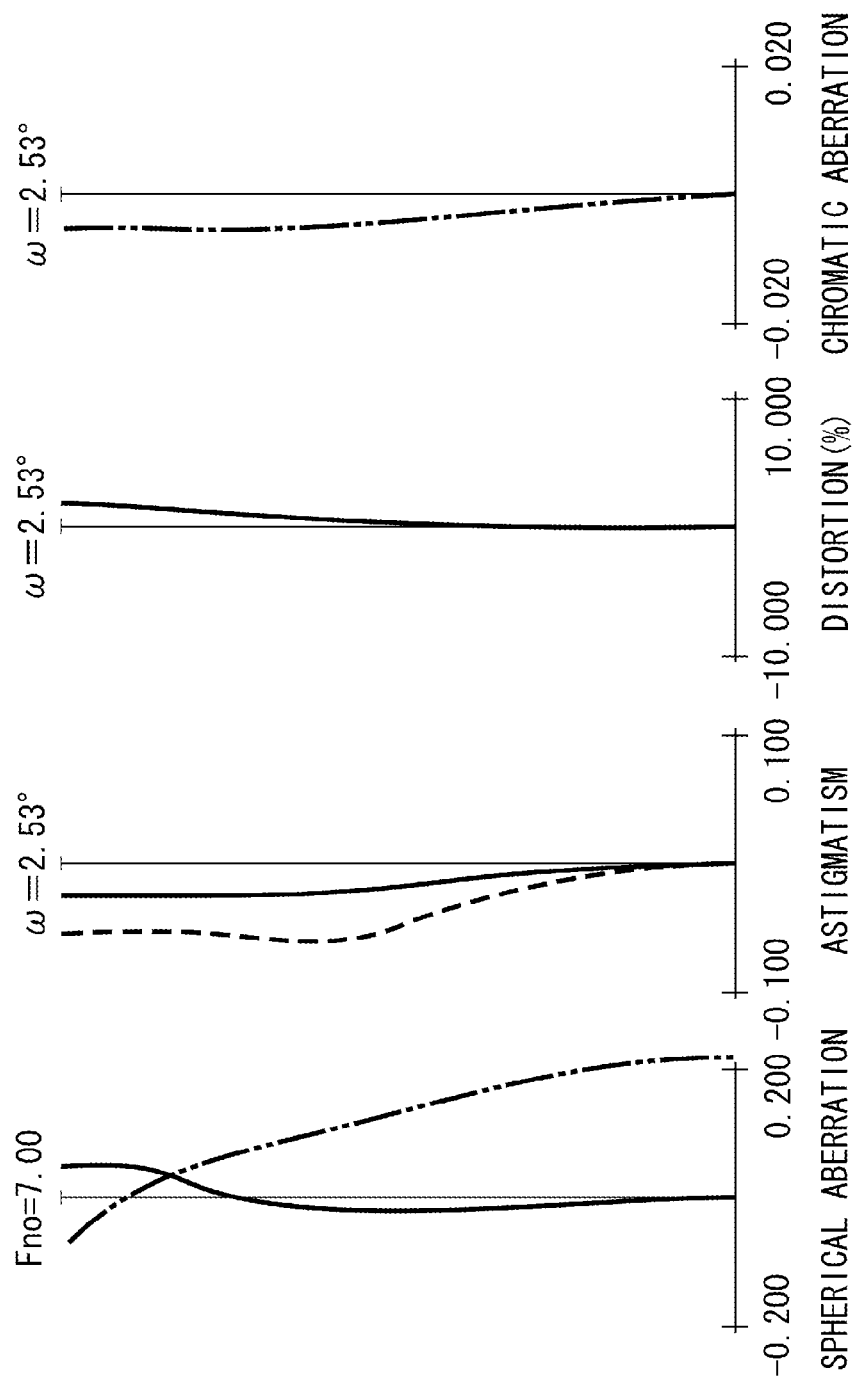

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the same, and, more particularly, to a zoom lens that is, for example, suitable for an image pickup apparatus using a solid-state image sensor such as a video camera, an electronic still camera, a broadcasting camera, a monitoring camera, or for an image pickup apparatus such as a camera using a silver-halide film.

2. Description of the Related Art

In recent years, image pickup apparatuses such as a video camera, a digital still camera, a broadcasting camera, and a monitoring camera using a solid-state image sensor, and a camera using a silver-halide film have been highly advanced, and the entire units thereof have been downsized. Therefore, a compact (small) zoom lens having a short total lens length with a high zoom ratio (high variable magnification ratio) and a high resolution is required as a photographic optical system used for the image pickup apparatuses.

As a zoom lens that meets the needs, a positive-lead type zoom lens in which a lens unit having a positive refractive power is arranged at an object side is known. As the positive-lead type zoom lens, a five-unit zoom lens including five lens units having positive, negative, positive, negative, and positive refractive powers in order from an object side to an image side is known (U.S. Pat. Nos. 6,404,561, 7,177,092, and Japanese Patent Application Laid-Open No. 2007-219040).

Typically, in order to downsize the entire zoom lens as well as to realize a high zoom ratio of the zoom lens, a refractive power of a main variator lens unit is increased and an amount of movement of the main variator lens unit during zooming is increased. When the refractive power of the main variator lens unit is increased and the amount of movement is increased, it becomes easy to realize a high zoom ratio. However, an aberration variation during zooming increases, and it becomes difficult to obtain high optical performance over the entire zoom range.

To realize the high zoom ratio and the downsizing of the entire lens system as well as to obtain the optical performance in the above-described five-unit zoom lens, it becomes important to appropriately set a movement condition and the like according to the refractive power or zooming of each lens unit.

Especially, it becomes important to appropriately set, during zooming, a variation of an air distance between a third lens unit and a fourth lens unit, a variation of an air distance between the fourth lens unit and a fifth lens unit, a refractive power (the reciprocal of a focal length) of a first lens unit and the fourth lens unit, and the like. If these configurations are not appropriately set, it becomes exceedingly difficult to realize the downsizing of an effective diameter of a front lens, to ensure the high zoom ratio, as well as to obtain the high optical performance over the entire zoom range.

In any of the five-unit zoom lenses discussed in U.S. Pat. Nos. 6,404,561, 7,177,092, and Japanese Patent Application Laid-Open No. 2007-219040, a distance between the first lens unit and the second lens unit increases, and a distance between the second lens unit and the third lens unit decreases during zooming from a wide-angle end to a telephoto end. Further, zooming is carried out in such a way that each lens unit is moved to increase a distance between the third lens unit and the fourth lens unit and to increase a distance between the fourth lens unit and the fifth lens unit. Any of the five-unit zoom lenses discussed in U.S. Pat. Nos. 6,404,561, 7,177,092, and Japanese Patent Application Laid-Open No. 2007-219040 has an approximately 10× zoom ratio, and the zoom ratio is not necessarily sufficient. Further, a total lens length from a lens surface closest to the object side to an image plane at a wide-angle end is relatively long and is approximately 13 to 16 times a focal length at the wide-angle end, and the total lens length is more likely to become longer.

SUMMARY OF THE INVENTION

An example of the present invention is directed to a zoom lens having a high zoom ratio, a short total lens length, and high optical performance over the entire zoom range, and an image pickup apparatus including the zoom lens.

According to an aspect of the present invention, a zoom lens includes, in order from an object side to an image side a first lens unit having a positive refractive power, a second lens unit having a negative refractive power, a third lens unit having a positive refractive power, a fourth lens unit having a negative refractive power, and a fifth lens unit having a positive refractive power, wherein each of the lens units moves in such a way that, during zooming from a wide-angle end to a telephoto end, a distance between the first lens unit and the second lens unit increases, a distance between the second lens unit and the third lens unit decreases, a distance between the third lens unit and the fourth lens unit increases, and a distance between the fourth lens unit and the fifth lens unit increases, and wherein the following conditions are satisfied:

$$4.0 < (D34t + D45t)/(D34w + D45w) < 15.0$$

$$1.0 < (D34t - D34w)/fw < 6.0$$

$$-0.9 < f4/ft < -0.1$$

$$-2.0 < f1/f4 < -0.5$$

where the distances between the third lens unit and the fourth lens unit at the wide-angle end and at the telephoto end are D34w and D34t, respectively, the distances between the fourth lens unit and the fifth lens unit at the wide-angle end and at the telephoto end are D45w and D45t, respectively, focal lengths of the entire zoom lens at the wide-angle end and at the telephoto end are fw and ft, respectively, and focal lengths of the first lens unit and the fourth lens unit are f1 and f4, respectively.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A, 2B, and 2C are aberration diagrams of the zoom lens at the wide-angle end, at the middle zoom position, and at the telephoto end, respectively, according to the first exemplary embodiment of the present invention.

FIGS. 4A, 4B, and 4C are aberration diagrams of the zoom lens at the wide-angle end, at the middle zoom position, and at the telephoto end, respectively, according to the second exemplary embodiment of the present invention.

FIGS. 5A, 5B, and 5C are lens cross sectional views of a zoom lens at the wide-angle end, at the middle zoom position, and at the telephoto end, respectively, according to a third exemplary embodiment of the present invention.

FIGS. 8A, 8B, and 8C are aberration diagrams of the zoom lens at the wide-angle end, at the middle zoom position, and at the telephoto end, respectively, according to the fourth exemplary embodiment of the present invention.

DESCRIPTION OF THE EMBODIMENTS

Various exemplary embodiments, features, and aspects of the invention will be described in detail below with reference to the drawings.

A zoom lens according to an exemplary embodiment of the present invention includes, in order from an object side to an image side, a first lens unit having a positive refractive power, a second lens unit having a negative refractive power, a third lens unit having a positive refractive power, a fourth lens unit having a negative refractive power, and a fifth lens unit having a positive refractive power. During zooming from a wide-angle end to a telephoto end, each of the lens units moves in such a way that a distance between the first lens unit and the second lens unit increases, a distance between the second lens unit and the third lens unit decreases, a distance between the third lens unit and the fourth lens unit increases, and a distance between the fourth lens unit and the fifth lens unit increases.

Figure 1A:
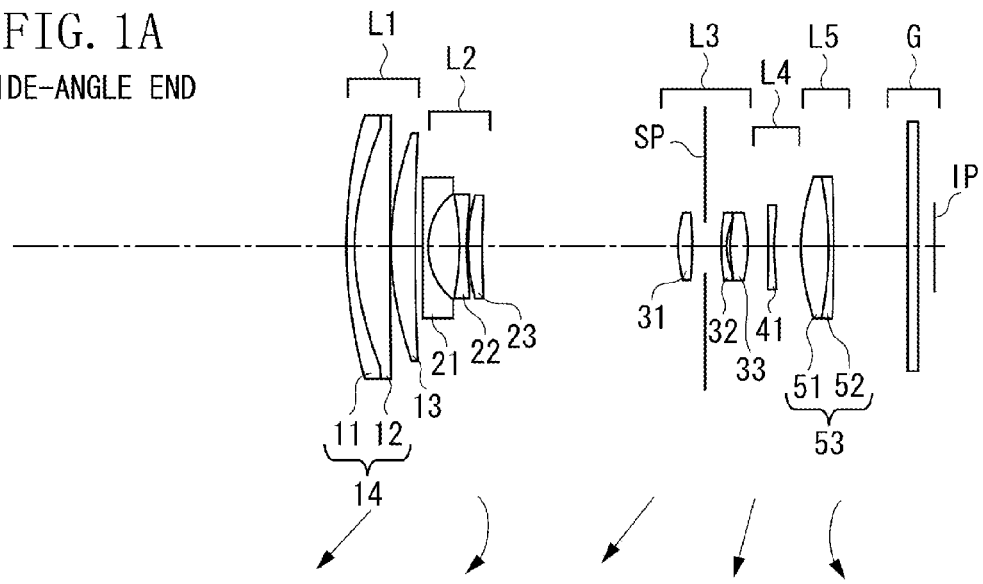
FIGS. 1A, 1B, and 1C are lens cross sectional views of a zoom lens at a wide-angle end, at a middle zoom position, and at a telephoto end, respectively, according to a first exemplary embodiment of the present invention.
Figure 1B:
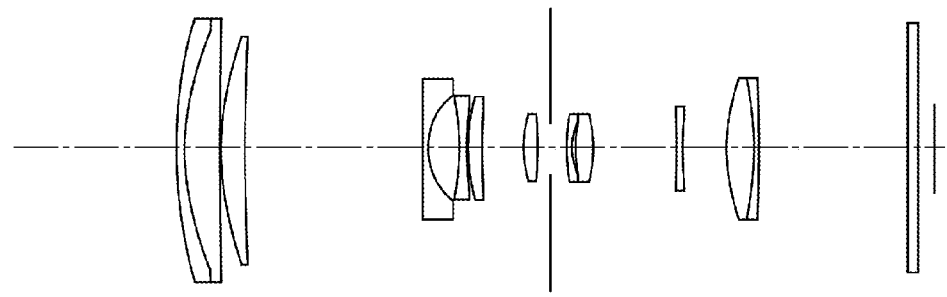
Figure 1C:
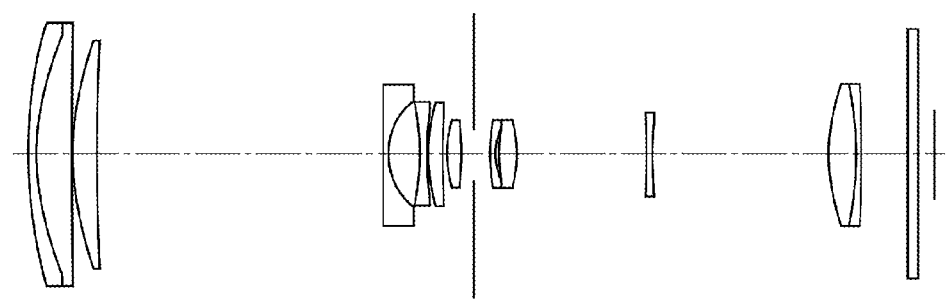
Figure 2B:
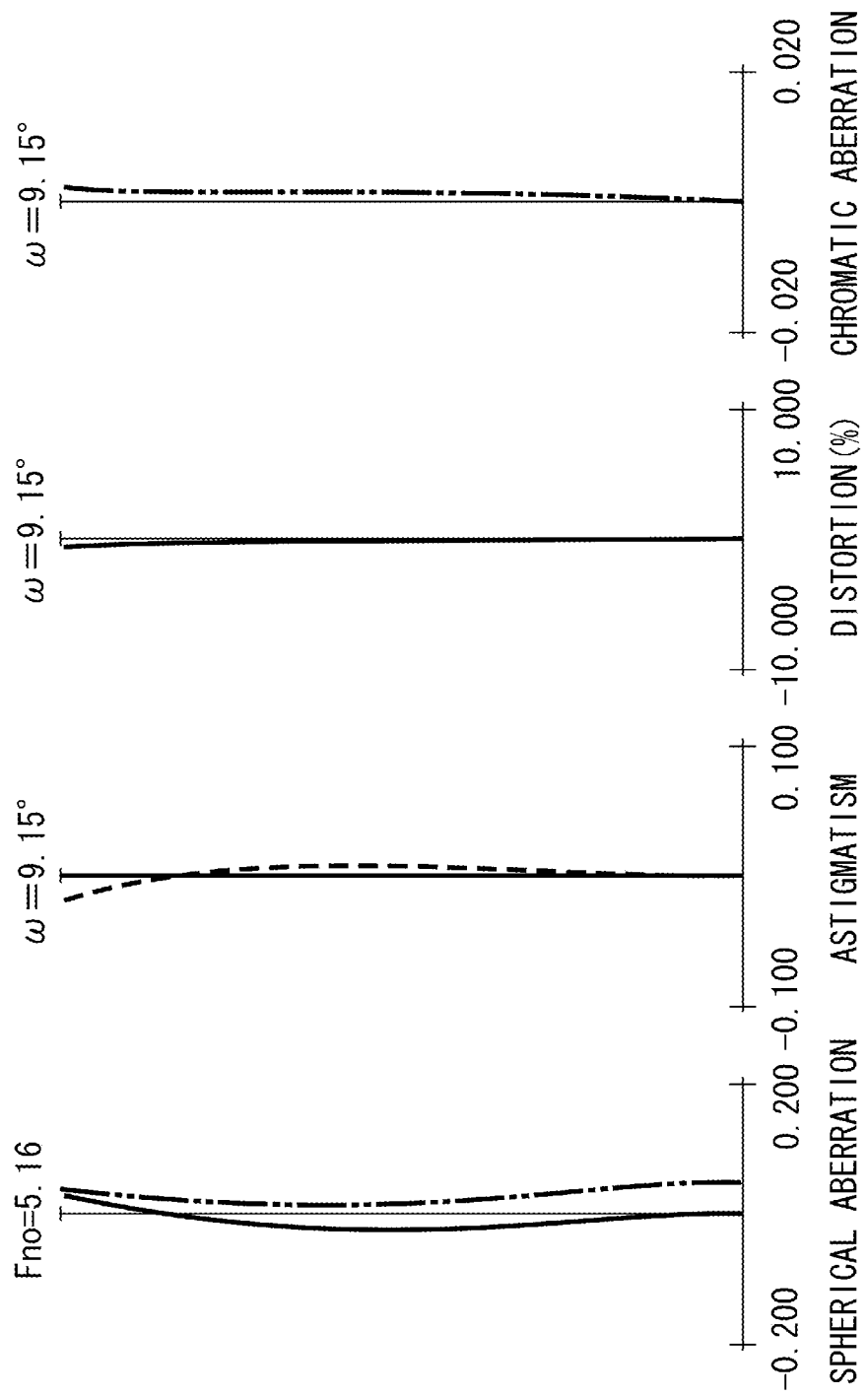

FIGS. 1A, 1B, and 1C are lens cross sectional views of a zoom lens at a wide-angle end (short focal length end), at a middle zoom position, and at a telephoto end (long focal length end), respectively, according to a first exemplary embodiment of the present invention. FIGS. 2A, 2B, and 2C are aberration diagrams of the zoom lens at the wide-angle end, at the middle zoom position, and at the telephoto end, respectively, according to the first exemplary embodiment. The first exemplary embodiment employs a zoom lens having a zoom ratio of 18.96 and an aperture ratio of approximately 3.61 to 7.00.

Figure 3A:
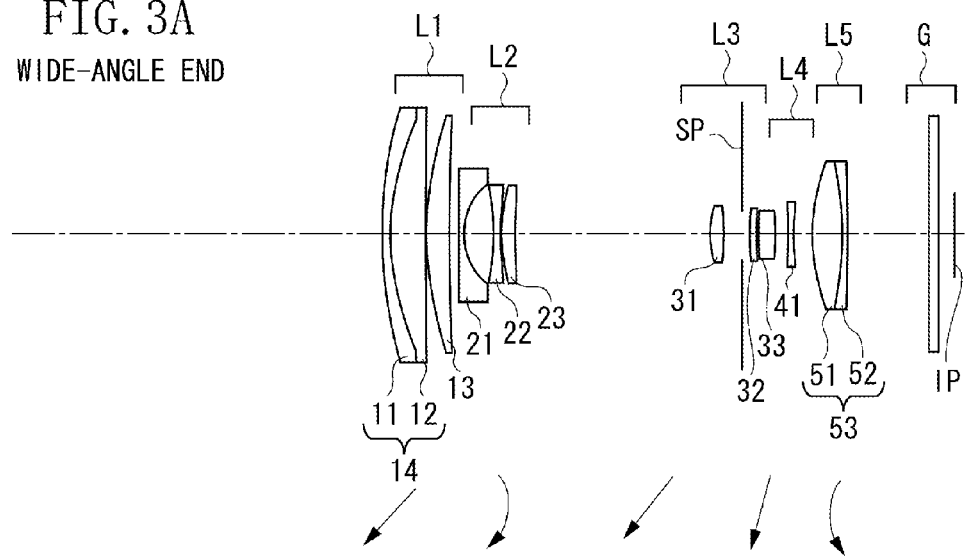
FIGS. 3A, 3B, and 3C are lens cross sectional views of a zoom lens at the wide-angle end, at the middle zoom position, and at the telephoto end, respectively, according to a second exemplary embodiment of the present invention.
Figure 3B:
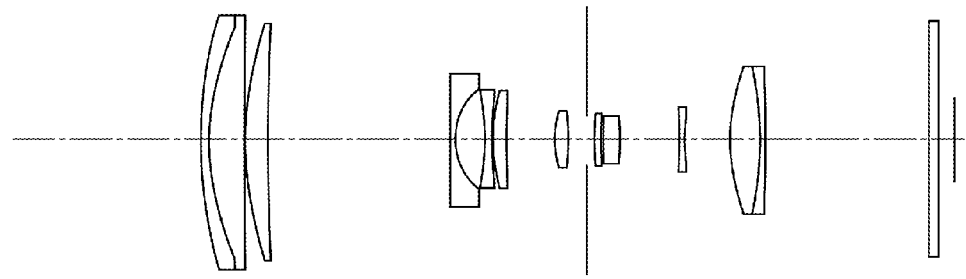
Figure 3C:
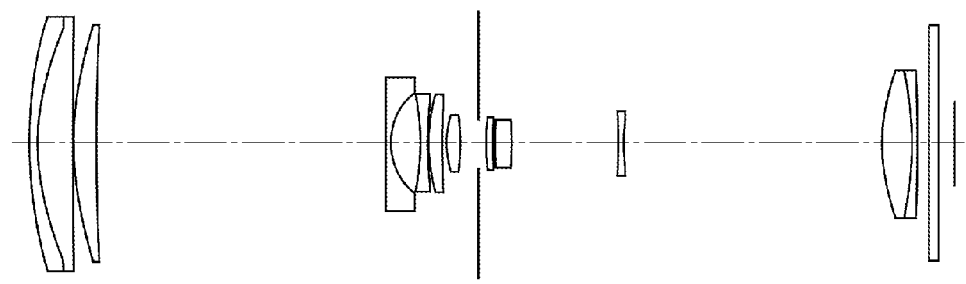
Figure 4B:
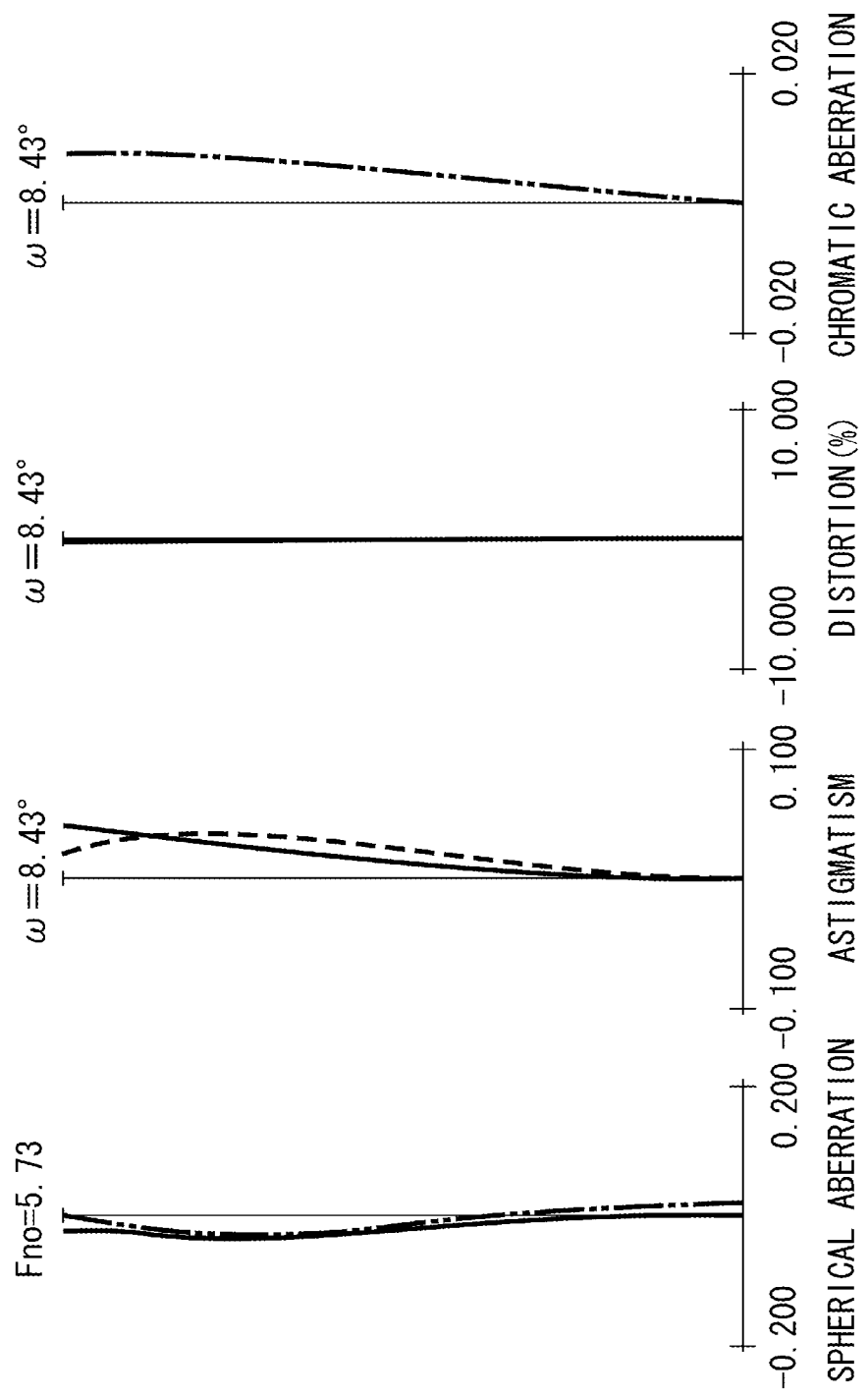

FIGS. 3A, 3B, and 3C are lens cross sectional views of a zoom lens at the wide-angle end, at the middle zoom position, and at the telephoto end, respectively, according to a second exemplary embodiment of the present invention. FIGS. 4A, 4B, and 4C are aberration diagrams of the zoom lens at the wide-angle end, at the middle zoom position, and at the telephoto end, respectively, according to the second exemplary embodiment. The second exemplary embodiment employs a zoom lens having a zoom ratio of 29.12 and an aperture ratio of approximately 3.61 to 10.00.

Figure 6A:
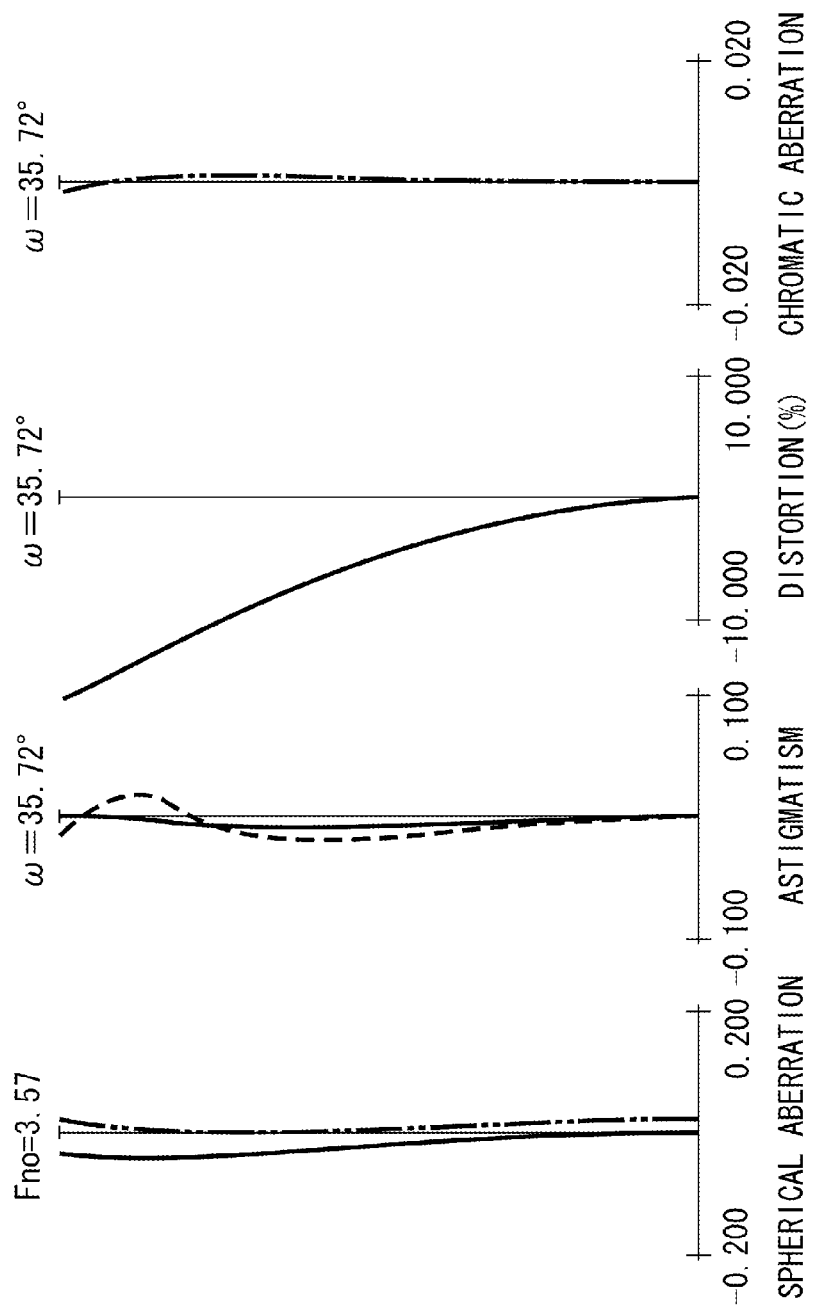
FIGS. 6A, 6B, and 6C are aberration diagrams of the zoom lens at the wide-angle end, at the middle zoom position, and at the telephoto end, respectively, according to the third exemplary embodiment of the present invention.
Figure 6B:
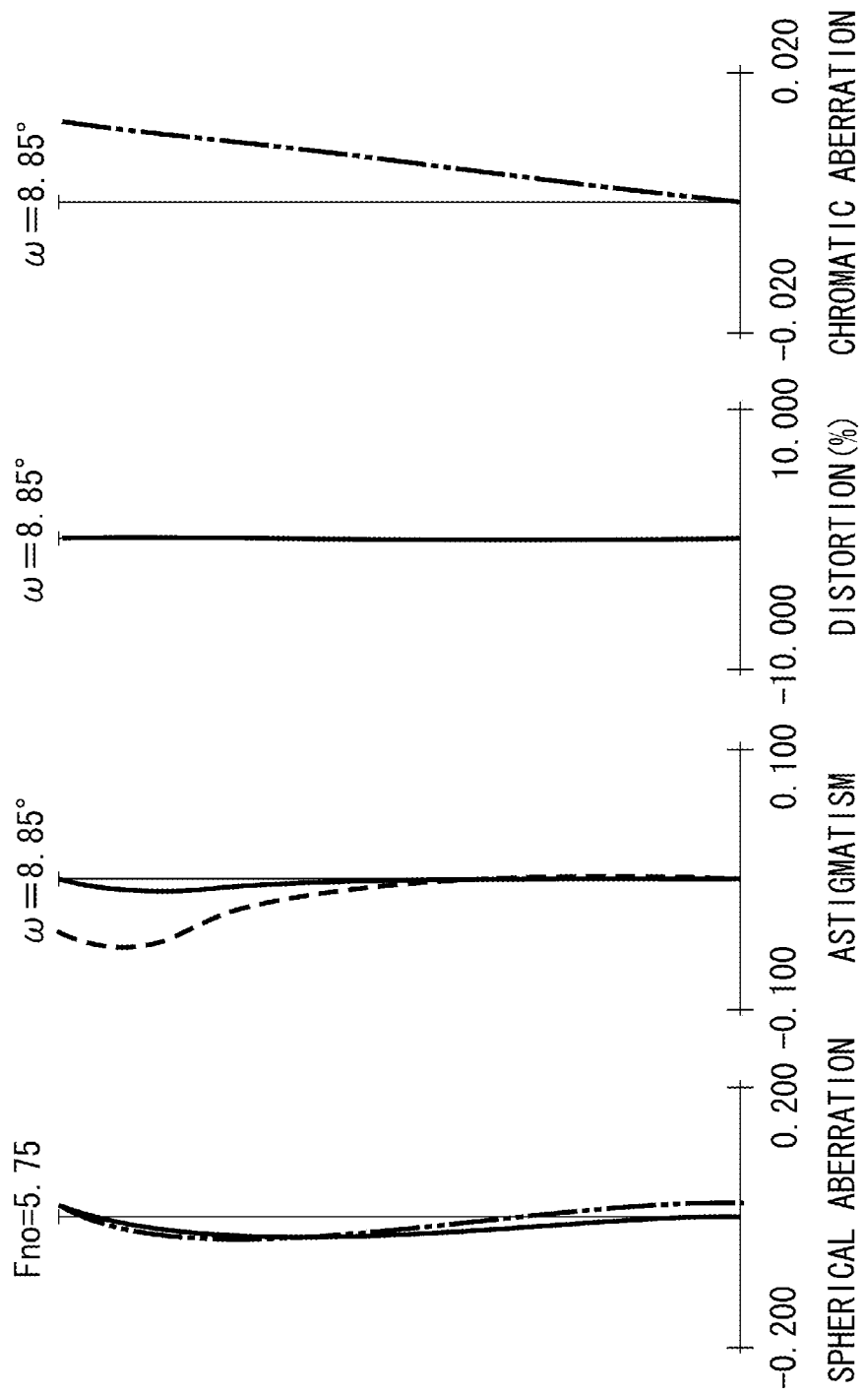
Figure 6C:
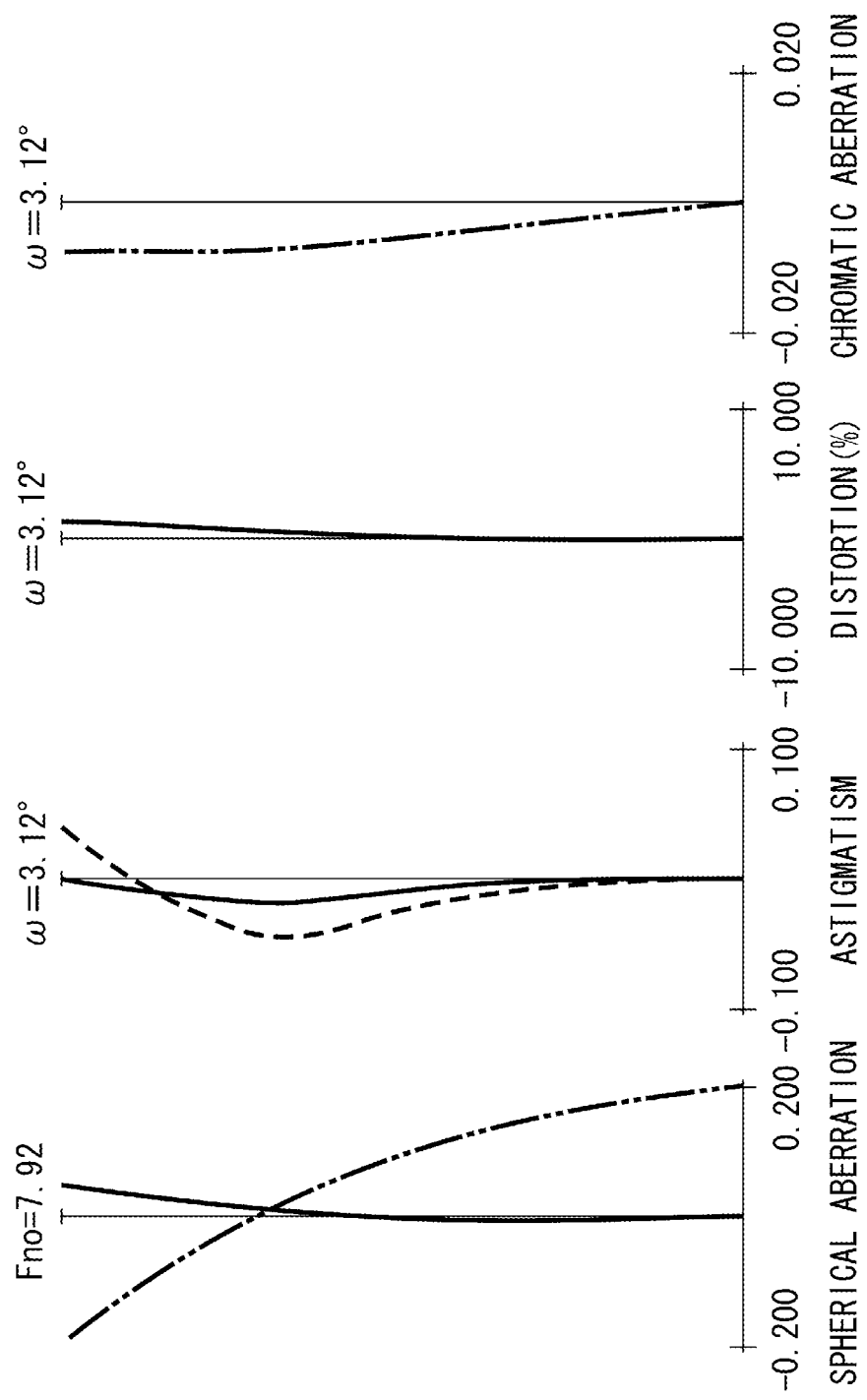

FIGS. 5A, 5B, and 5C are lens cross sectional views of a zoom lens at the wide-angle end, at the middle zoom position, and at the telephoto end, respectively, according to a third exemplary embodiment of the present invention. FIGS. 6A, 6B, and 6C are aberration diagrams of the zoom lens at the wide-angle end, at the middle zoom position, and at the telephoto end, respectively, according to the third exemplary embodiment. The third exemplary embodiment employs a zoom lens having a zoom ratio of 15.32 and an aperture ratio of approximately 3.57 to 7.92.

Figure 7A:
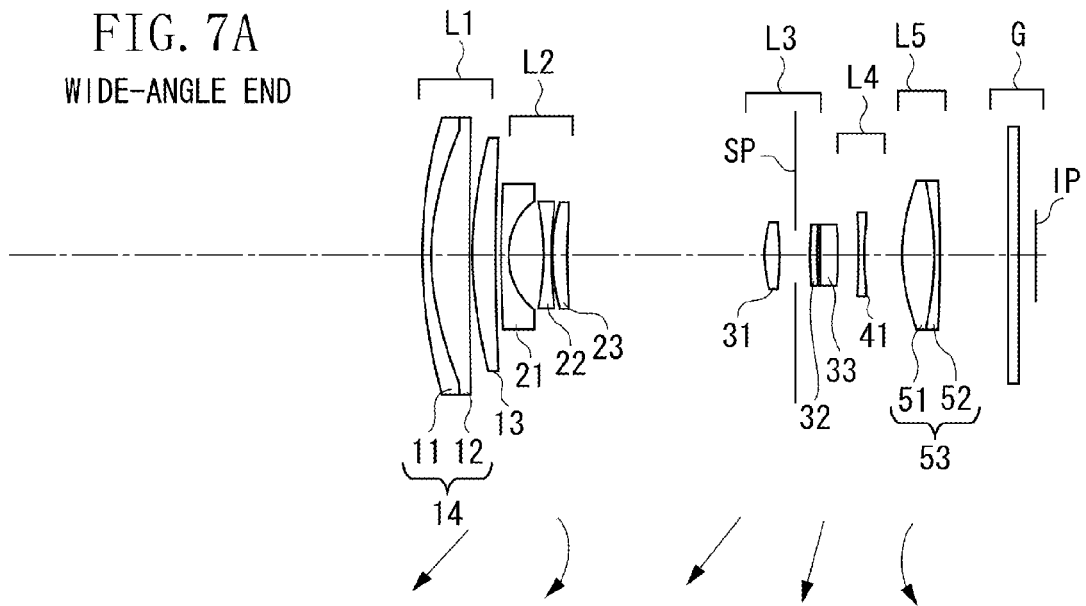
FIGS. 7A, 7B, and 7C are lens cross sectional views of a zoom lens at the wide-angle end, at the middle zoom position, and at the telephoto end, respectively, according to a fourth exemplary embodiment of the present invention.
Figure 7B:
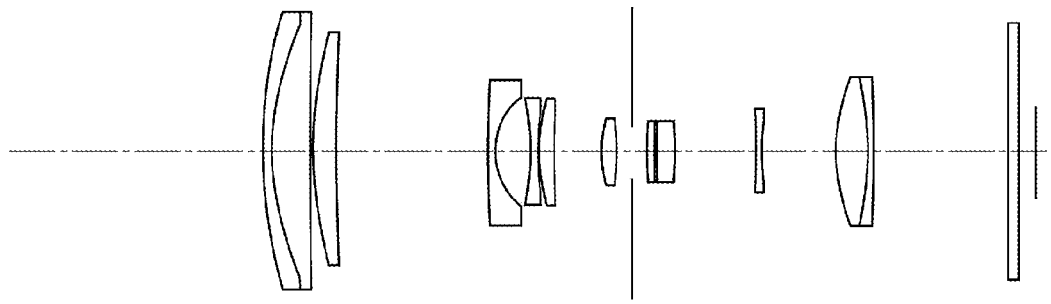
Figure 7C:
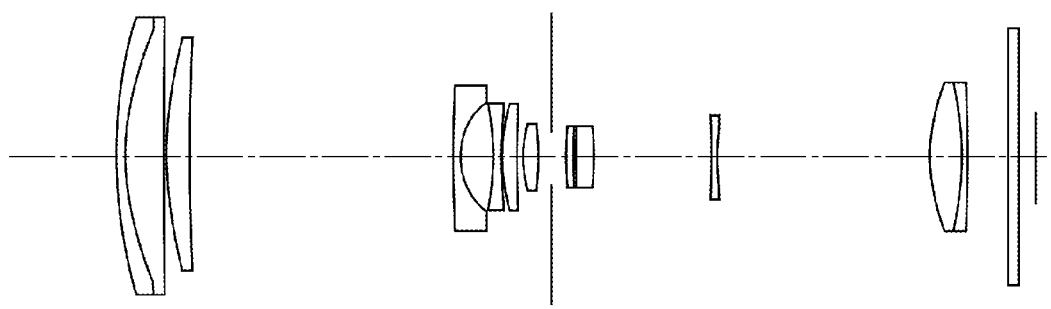
Figure 8B:
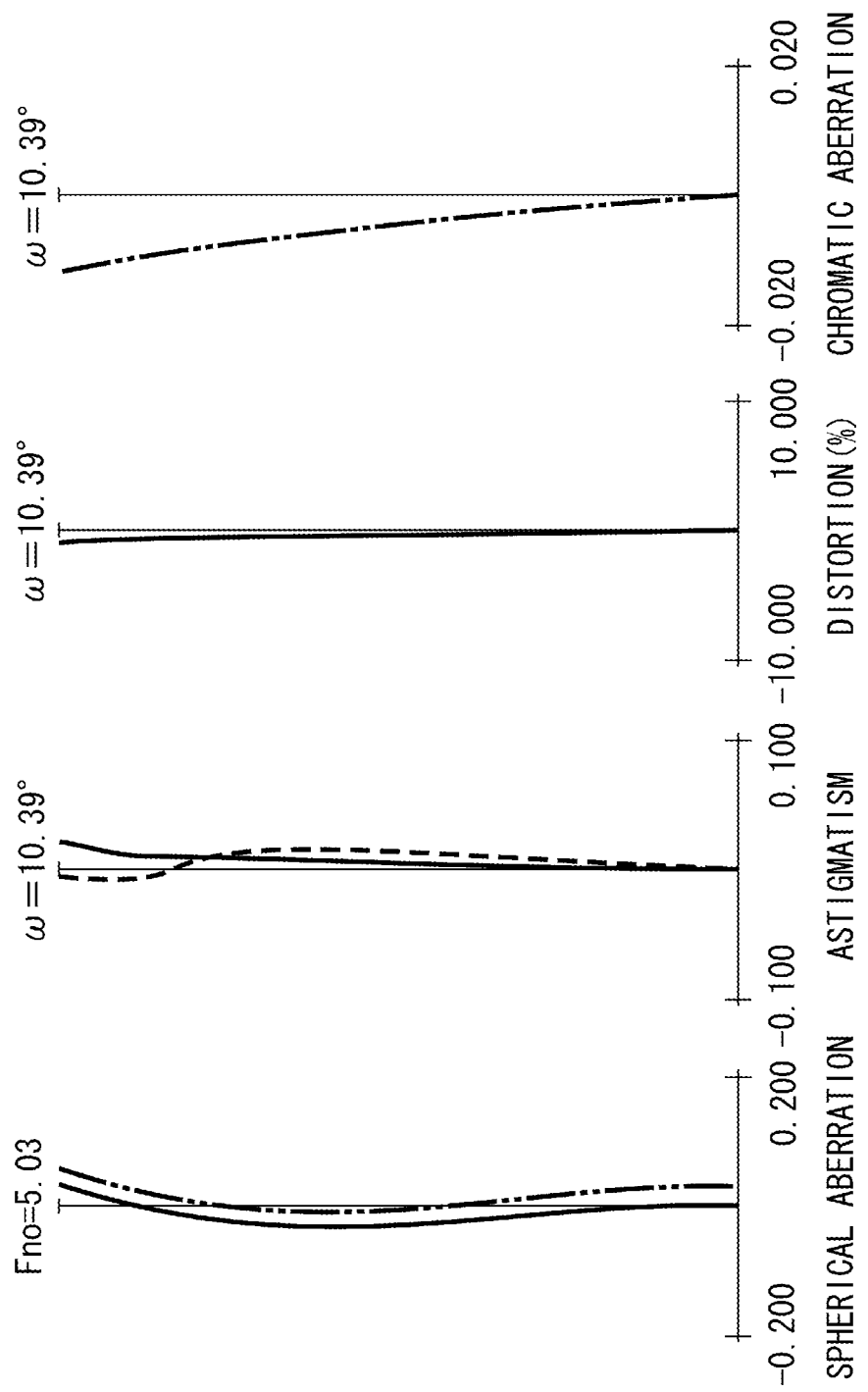

FIGS. 7A, 7B, and 7C are lens cross sectional views of a zoom lens at the wide-angle end, at the middle zoom position, and at the telephoto end, respectively, according to a fourth exemplary embodiment of the present invention. FIGS. 8A, 8B, and 8C are aberration diagrams of the zoom lens at the wide-angle end, at the middle zoom position, and at the telephoto end, respectively, according to the fourth exemplary embodiment. The fourth exemplary embodiment employs a zoom lens having a zoom ratio of 19.02 and an aperture ratio of approximately 3.61 to 7.00.

Figure 9:
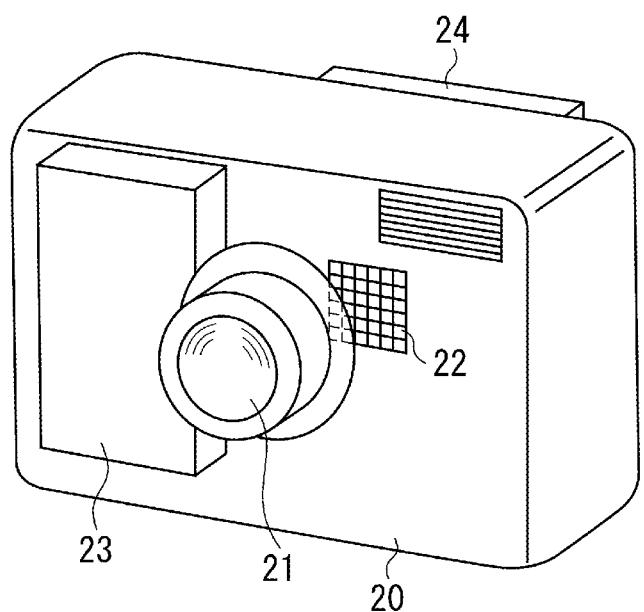
FIG. 9 is a schematic diagram of principal components of an image pickup apparatus according to an exemplary embodiment of the present invention.

FIG. 9 is a schematic diagram of principal components of an image pickup apparatus according to an exemplary embodiment of the present invention. The zoom lenses according to the exemplary embodiments of the present invention are used for an image pickup apparatus such as a digital camera, a video camera, and a silver-halide film camera, an observation apparatus such as a telescope and a pair of binoculars, and an optical apparatus such as a copying machine and a projector. In the cross sectional views of the lenses, the left side is a front side (an object side and an enlargement side) and the right side is a rear side (an image side and a reduction side). In the cross sectional views of the lenses, the order of the lens units from the object side to the image side is represented by "i", and the "i-th" lens unit is represented by "Li".

Next, characteristics of the zoom lens of each exemplary embodiment will be described. In the cross sectional view of the lenses of each exemplary embodiment, the first lens unit having a positive refractive power (optical power=a reciprocal of the focal length) is represented by "L1", the second lens unit having a negative refractive power is represented by "L2", the third lens unit having a positive refractive power is represented by "L3", the fourth lens unit having a negative refractive power is represented by "L4", and the fifth lens unit having a positive refractive power is represented by "L5". An F-number determination member (hereinafter, also referred to as an "aperture stop") that functions as an aperture stop to determine (limit) a full-aperture F-number (Fno) light flux is represented by "SP". An optical block corresponding to an optical filter, a face plate, a crystal low-pass filter, an infrared cut filter, and or the like is represented by "G".

An image plane is represented by "IP", on which an imaging plane of a solid-state image sensor (photoelectric conversion element) such as a charge-coupled device (CCD) sensor or a complementary metal oxide semiconductor (CMOS) sensor is placed when the zoom lens is used as a photographic optical system of a video camera or a digital still camera. When the zoom lens is used as a photographic optical system of a silver-halide film camera, a photosensitive surface equivalent to a film surface is placed on the image plane. In the aberration diagrams, the solid line of a spherical aberration represents d line, the two-dot chain line represents g line, the solid line of astigmatism represents a meridional image plane, the broken line represents a sagittal image plane, and the g line represents chromatic aberration of magnification.

The arrow illustrates a moving locus of each lens unit during zooming from the wide-angle end to the telephoto end.

In the zoom lens of each exemplary embodiment, each lens unit moves during zooming from the wide-angle end to the telephoto end, and a distance between lens units changes as follows. That is, the distance between the first lens unit L1 and the second lens unit L2 increases, the distance between the second lens unit L2 and the third lens unit L3 decreases, the distance between the third lens unit L3 and the fourth lens unit L4 increases, and the distance between the fourth lens unit L4 and the fifth lens unit L5 increases.

At this time, the first lens unit L1, the third lens unit L3, and the fourth lens unit L4 are positioned closer to the object side at the telephoto end than they are at the wide-angle end. Also, the second lens unit L2 moves along a locus that is convex toward the image side, and the fifth lens unit L5 moves along a locus that is convex toward the object side, during zooming from the wide-angle end to the telephoto end. The F-number determination member SP is arranged within the third lens unit L3 with respect to an optical axis direction.

Since the distance between the second lens unit L2 and the third lens unit L3 at the telephoto end can be decreased by arranging the aperture stop SP in the above manner, an amount of change of the distance between the second lens unit L2 and the third lens unit L3 for zooming can be sufficiently ensured. As a result, a zoom lens having a high zoom ratio is obtained. Note that the position of the aperture stop SP is not limited within the third lens unit L3, and it can be arranged at any position as long as the position is close to the third lens unit L3 between the second lens unit L2 and the third lens unit L3, or between the third lens unit L3 and the fourth lens unit L4.

The zoom lens of each exemplary embodiment obtains a magnification-varying action by the change of the distances between the plurality of lens units to achieve a high zoom ratio. First, during zooming from the wide-angle end to the telephoto end, the first lens unit L1 is moved toward the object side so that the distance between the first lens unit L1 and the second lens unit L2 is increased (widened) at the telephoto end, as compared with at the wide-angle end. As a result, the magnification-varying action is obtained. Further, during zooming from the wide-angle end to the telephoto end, the third lens unit L3 is moved toward the object side so that the distance between the second lens unit L2 and the third lens unit L3 at the telephoto end is decreased (narrowed), as compared with at the wide-angle end. As a result, the magnification-varying action is obtained. The above is the magnification-varying action according to the change of the distances of the lens units at the object side of the aperture stop SP.

Further, in the zoom lens of each exemplary embodiment, the distance between the third lens unit L3 and the fourth lens unit L4 is increased at the telephoto end, as compared with at the wide-angle end, so that the magnification-varying action is obtained. Further, the distance between the fourth lens unit L4 and the fifth lens unit L5 is increased at the telephoto end, as compared with at the wide-angle end, so that the magnification-varying action is obtained. The above is the magnification-varying action according to the change of the distances of the lens units at the image plane side of the aperture stop SP.

In this way, the magnification-varying action is shared by the change of the distances of the plurality of lens units, whereby increase of a movement stroke during zooming and when realizing a high zoom ratio is suppressed. Further, the total lens length at the telephoto end is shortened. Especially, the distance between the third lens unit L3 and the fourth lens unit L4 and the distance between the fourth lens unit L4 and the fifth lens unit L5 are appropriately increased to satisfy the condition (1) described below, whereby the magnification-varying action at the image plane side of the aperture stop SP is enhanced, and the high zoom ratio is realized. Also, the share of the magnification-varying of the lens units at the image side of the aperture stop SP is increased, whereby the share of the magnification-varying of the lens units at the object side of the aperture stop SP is reduced.

In this way, the movement stroke of the first lens unit L1 during zooming is shortened to satisfy the condition (5) described below, and the total lens length at the telephoto end (the distance from the first lens surface to the image plan) is shortened while an increase of an effective diameter of a front lens is suppressed.

In the zoom lens of each exemplary embodiment, the refractive powers of the first lens unit L1 and the second lens unit L2 are increased to some degree to satisfy the conditions (4) and (7), so that the distance between the first lens unit L1 and the aperture stop SP at the wide-angle end is decreased. In this way, an effective diameter of the lenses of the first lens unit L1 is downsized. Further, the total lens length at the wide-angle end is shortened. Further, the refractive power of the third lens unit L3 is increased to some degree to satisfy the condition (8) described below, so that the distance from the aperture stop SP to the image plane IP is decreased. In this way, the total lens length at the wide-angle end is shortened.

Also, the refractive powers of the fourth lens unit L4 and the fifth lens unit L5 are increased to some degree to satisfy the conditions (3) and (9) described below, so that the magnification-varying action at the image side of the aperture stop SP is enhanced. An arbitrary lens unit is moved in the optical axis direction to carryout focusing. For example, the first lens unit L1 or the fifth lens unit L5 is moved toward the object side, or the fourth lens unit L4 is moved toward the image side, so that focusing from an infinitely-distant object to a closest-distance object is carried out.

With such a lens structure, the increase of the total lens length at the wide-angle end and at the telephoto end is suppressed while a high zoom ratio is achieved. Note that, in each exemplary embodiment, an image shake due to vibration of the zoom lens may be corrected by moving an arbitrary lens unit to have a component in s direction perpendicular to the optical axis.

Next, a lens configuration of each lens unit will be described. Hereinafter, the order is from the object side to the image side unless otherwise specially noted. The first lens unit L1 includes a cemented lens 14 in which a negative lens 11 and a positive lens 12 are cemented, and a meniscus-shaped positive lens 13 having a convex surface at the object side. In the zoom lens of each exemplary embodiment, the refractive power of the first lens unit L1 is increased so that the zoom lens can be downsized and can realize a high zoom ratio. At this time, aberration, especially, spherical aberration, often occurs at a telephoto side in the first lens unit L1. Therefore, the cemented lens 14 and the positive lens 13 share the positive refractive power of the first lens unit L1 to reduce the occurrence of the aberration.

Note that the positive lens 12 uses a low-dispersion material having the Abbe number of more than 80. As a result, axial chromatic aberration and chromatic aberration of magnification at the telephoto side are appropriately corrected. The second lens unit L2 includes a negative lens 21 having a larger absolute value of the refractive power on the image side than on the object side and having a concave surface at the image side, a biconcave negative lens 22, and a positive lens 23 having a convex surface at the object side. In the zoom lens of each exemplary embodiment, the refractive power of the second lens unit L2 is increased so that a wide angle of view at the wide-angle end can be obtained while the effective diameter of the first lens unit L1 can be downsized. At this time, the aberration, especially, curvature of field, often occurs at the wide-angle side, and spherical aberration often occurs at the telephoto side in the second lens unit L2.

In each exemplary embodiment, two negative lenses share the negative refractive power of the second lens unit L2 to decrease the occurrence of aberration. With such a lens configuration, the effective diameter of a front lens can be downsized and the high optical performance can be obtained while the wide angle of view can be achieved. Note that the positive lens 23 uses a high-dispersion material having the Abbe number of smaller than 20 so that the refractive power necessary for achromatic processing of each lens of the second lens unit L2 can be minimized. In this way, the number of lenses is reduced and the downsizing is achieved.

The third lens unit L3 includes a positive lens 31 having a convex surface at the object side, a negative lens 32 having a concave surface at the image side, and a positive lens 33. The refractive power of the third lens unit L3 is increased so that the magnification-varying action of the third lens unit L3 can be enhanced while the total lens length at the wide-angle end can be shortened. At this time, the aberration, especially, spherical aberration, coma aberration, and axial chromatic aberration, often occur in the third lens unit L3 over the entire zoom range.

Therefore, two positive lenses share the positive refractive power of the third lens unit L3 to reduce the occurrence of the aberration. Note that the negative lens 32 uses a high-dispersion material having the Abbe number of smaller than 30, whereby the refractive power necessary for achromatic processing of each lens of the third lens unit L3 is suppressed. In this way, the number of lenses is decreased and the downsizing is achieved.

The fourth lens unit L4 composed only of a negative lens 41. In each exemplary embodiment, a small number of lenses constitute the fourth lens unit L4, whereby a thinner and lighter lens is achieved. The fifth lens unit L5 includes a cemented lens 53 in which a positive lens 51 and negative lens 52 are cemented. With the cemented lens 53, the occurrence of chromatic aberration of magnification is appropriately suppressed over the entire zoom range even in a case where the refractive power of the fifth lens unit L5 is increased.

In each exemplary embodiment, the distances between the third lens unit L3 and the fourth lens unit L4 at the wide-angle end and at the telephoto end are represented by D34w and D34t, respectively. The distances between the fourth lens unit L4 and the fifth lens unit L5 at the wide-angle end and at the telephoto end are represented by D45w and D45t, respectively. The focal lengths of the entire zoom lens at the wide-angle end and at the telephoto end are represented by fw and ft, respectively, and the focal lengths of the first lens unit L1 and the fourth lens unit L4 are represented by f1 and f4, respectively.

Here, the following conditions are satisfied:

$$4.0 < (D34t + D45t)/(D34w + D45w) < 15.0 \quad (1)$$

$$1.0 < (D34t - D34w)/fw < 6.0 \quad (2)$$

$$-0.9 < f4/ft < -0.1 \quad (3)$$

$$-2.0 < f1/f4 < -0.5 \quad (4)$$

The condition (1) defines a distance change between the third lens unit L3 and the fourth lens unit L4 and a distance change between the fourth lens unit L4 and the fifth lens unit L5 during zooming. If the distance change is too large with the upper limit of the condition (1) exceeded, the amount of movement of the third lens unit L3 toward the object side becomes too large. At this time, the amount of movement during zooming of the aperture stop SP within or in the vicinity of the third lens unit L3 becomes too large, and a change of an exit pupil distance at the wide-angle end and at the telephoto end becomes large.

Therefore, a change of an incident angle at which an off-axis light flux enters a solid-state image sensor becomes large, and it becomes difficult to appropriately correct shading over the entire zoom range. If the distance change is too small with the lower limit of the condition (1) exceeded, the magnification-varying action at the image side of the aperture stop SP is reduced, and it becomes difficult to obtain a desirable zoom ratio. When the magnification-varying action at the object side of the aperture stop SP is increased to obtain the desired zoom ratio, the effective diameter of a front lens is increased.

The condition (2) defines a distance change during zooming between the third lens unit L3 and the fourth lens unit L4. If the distance change is too large with the upper limit of the condition (2) exceeded, the distance between the aperture stop SP and the fourth lens unit L4 at the telephoto end becomes too large, and the effective diameter of the fourth lens unit L4 is increased. Meanwhile, if the distance change is too small with the lower limit of the condition (2) exceeded, the magnification-varying action by the lens units at the image side of the aperture stop SP is reduced, and it becomes difficult to obtain a desired zoom ratio. When the magnification-varying action by the lens units at the object side of the aperture stop SP is increased to obtain a desired zoom ratio, the effective diameter of a front lens is increased.

The condition (3) defines the focal length, that is, the refractive power of the fourth lens unit L4. If the focal length of the fourth lens unit L4 is too large with the lower limit of the condition (3) exceeded, that is, the refractive power is too small, the magnification-varying action is reduced, and it becomes difficult to realize a high zoom ratio. Therefore, if the amount of movement of the third lens unit L3 and the fourth lens unit L4 is increased to supplement the zoom ratio during zooming, the total lens length at the telephoto end is increased. This is not desirable. If the focal length of the fourth lens unit L4 is too small with upper limit of the condition (3) exceeded, that is, the refractive power is too large, axial chromatic aberration, spherical aberration, and the like occur over the entire zoom range. If the number of lenses is increased to correct the aberration, the downsizing of the entire zoom lens becomes difficult.

The aberration is appropriately corrected while the magnification-varying action by the lens units at the image side of the aperture stop SP is especially enhanced by satisfying the conditions (1), (2), and (3) at the same time. As a result, the magnification-varying action of the second lens unit L2 is reduced and the movement stroke of the first lens unit L1 during zooming can be shortened, whereby the total lens length at the telephoto end can be shortened and the increase of the effective diameter of a front lens can be suppressed.

The condition (4) defines the focal length, that is, the refractive power of the first lens unit L1. If the focal length of the first lens unit L1 is too large with the lower limit of the condition (4) exceeded, that is, the refractive power is too small, the total lens length at the wide-angle end becomes longer. Also, since the distance between the first lens unit L1 and the aperture stop SP becomes longer, the effective diameter of a front lens is increased. If the focal length of the first lens unit L1 is too small with the upper limit of the condition (4) exceeded, that is, the refractive power is too large, spherical aberration often occurs in the first lens unit L1 at the telephoto end. If the number of lenses is increased to correct the aberration, the first lens unit increases in size, and the effective diameter of a front lens is increased. This is not desirable.

The aberration is corrected while the downsizing of the effective diameter of a front lens becomes easier by satisfying the condition (4) in addition to the conditions (1), (2), and (3). Especially, to achieve the high zoom ratio and the downsizing of the effective diameter of a front lens, it is desirable to satisfy the conditions (1), (2), (3), and (4).

It is further desirable to set numeric ranges of the conditions (1) to (4) as follows:

$$5.0 < (D34t + D45t)/(D34w + D45w) < 13.0 \quad (1a)$$

$$1.5 < (D34t - D34w)/fw < 5.0 \quad (2a)$$

$$-0.80 < f4/ft < -0.15 \quad (3a)$$

$$-1.8 < f1/f4 < -0.7 \quad (4a)$$

As described above, according to each of the exemplary embodiments, the positive-lead type zoom lens that has a short total lens length, a small effective diameter of a front lens, and a high zoom ratio can be obtained. Further, the positive-lead type zoom lens with appropriately corrected aberration and high optical performance over the entire zoom range can be obtained. In each of the exemplary embodiments, one or more of the following various conditions is desirably satisfied. Movement distances of the first lens unit L1 and the second lens unit L2 from the wide-angle end to the telephoto end during zooming are represented by M1 and M2, respectively. The focal lengths of the second lens unit L2, the third lens unit L3, and the fifth lens unit L5 are represented by f2, f3, and f5, respectively. The lateral magnification of the i-th lens unit (i=2 to 5) at the wide-angle end is represented by $\beta iw$.

The lateral magnification of the i-th lens unit (i=2 to 5) at the telephoto end is represented by $\beta it$. The fourth lens unit L4 includes one lens subunit having a negative refractive power, and the radiuses of curvature of lens surfaces of the lens subunit at the object side and the image side are represented by R4a and R4b, respectively. The distance on the optical axis from a lens surface closest to the object side to the image plane at the wide-angle end is represented by TDw. At this time, one or more of the following conditions is desirably satisfied:

$$-10.0 < M1/fw < -4.0 \quad (5)$$

$$-3.0 < M2/fw < -0.1 \quad (6)$$

$$-0.10 < f2/ft < -0.03 \quad (7)$$

$$0.05 < f3/ft < 0.20 \quad (8)$$

$$0.10 < f5/ft < 0.30 \quad (9)$$

$$0.4 < \{(\beta 3t \times \beta 4t \times \beta 5t)/(\beta 3w \times \beta 4w \times \beta 5w)\}/(\beta 2t/\beta 2w) < 1.5 \quad (10)$$

$$0.10 < (R4a + R4b)/(R4a - R4b) < 1.50 \quad (11)$$

$$8.0 < TDw/fw < 12.0 \quad (12)$$

Note that, as to plus and minus signs (+ and −) of the amounts of movement M1 and M2, the amount of movement toward the object side is defined as minus (−).

The condition (5) defines the amount of movement of the first lens unit L1 during zooming from the wide-angle end to the telephoto end. If the amount of movement toward the object side is too small with the upper limit of the condition (5) exceeded, the magnification-varying action by changing the distance between the first lens unit L1 and the second lens unit L2 is reduced. If the refractive power of the first lens unit L1 is increased to supplement the magnification-varying action, spherical aberrations often occurs at the telephoto side. Also, if the refractive power of the second lens unit L2 is increased to supplement the magnification-varying action, curvatures of field at the wide-angle side and spherical aberration at the telephoto side begin often occur. If the amount of movement toward the object side is too large with the lower limit of the condition (5) exceeded, the total lens length at the telephoto end is increased, and the downsizing of the entire zoom lens becomes difficult.

The condition (6) defines the amount of movement of the second lens unit L2 during zooming from the wide-angle end to the telephoto end. If the condition (1) is satisfied and the total lens length at the wide-angle end is shortened, the second lens unit L2 is inevitably positioned closer to the object side at the telephoto end than at the wide-angle end. Therefore, in a case where the condition (1) is satisfied and the upper limit of the condition (6) is exceeded, the total lens length at the wide-angle end is increased. Further, the effective diameter of the lenses that constitute the second lens unit L2 is increased. If the amount of movement toward the object side is too large with the lower limit of the condition (6) exceeded, the total lens length at the telephoto end is increased, and the downsizing of the entire zoom lens becomes difficult.

The condition (7) defines the refractive power, that is, the focal length of the second lens unit L2. If the focal length is too large exceeding with the lower limit of the condition (7) exceeded, that is, the refractive power is too small, the magnification-varying action of the second lens unit L2 is reduced, and it becomes difficult to obtain a desired zoom ratio. If the focal length is too small with the upper limit of the condition (7) exceeded, that is, the refractive power is too large, curvatures of field in the second lens unit L2 at the wide-angle side and spherical aberration in the second lens unit L2 at the telephoto side often occur.

The condition (8) defines the focal length, that is, the refractive power of the third lens unit L3. If the focal length of the third lens unit L3 is too large with the upper limit of the condition (8) exceeded, that is, the refractive power is too small, the magnification-varying action of the third lens unit L3 is reduced, and it becomes difficult to obtain a high zoom ratio. Therefore, if the amount of movement of the third lens unit is increased to supplement the zoom ratio during zooming, the total lens length at the telephoto end is increased, which is, therefore, not good. If the focal length of the third lens unit L3 is too small with the lower limit of the condition (8) exceeded, that is, the refractive power is too large, spherical aberrations, coma, axial chromatic aberration often occur in the third lens unit L3 over the entire zoom range.

The condition (9) defines the focal length, that is, the refractive power of the fifth lens unit L5. If the focal length of the fifth lens unit L5 is too large with the upper limit of the condition (9) exceeded, that is, the refractive power is too small, an effect of correcting a focus variation when focusing with the fifth lens unit L5 is reduced, and the amount of movement for focusing becomes longer. Therefore, quick focusing becomes difficult. If the focal length of the fifth lens unit L5 is too small with the lower limit of the condition (9) exceeded, that is, the refractive power is too large, the Petzval sum is increased, curvature of field over the entire zoom range is increased.

If the number of lenses is increased, the occurrence of curvature of field can be suppressed. However, in this case, since the weight of the lens is increased, the driving force for driving the fifth lens unit L5 is increased. This is not desirable.

The condition (10) defines ratios between the magnification-varying action of each lens unit from the third lens unit L3 to the fifth lens unit L5 and the magnification-varying action of the second lens unit L2. That is, the ratio between the magnification-varying action of the lens units at the image side of the aperture stop SP and the magnification-varying action of the lens unit at the object side of the aperture stop SP is defined. In a case where the zoom ratio of each lens unit from the third lens unit L3 to the fifth lens unit L5 is too large, as compared with the second lens unit L2, the upper limit of the condition (10) is exceeded.

In this case, the movement distance during zooming of the aperture stop SP within or in the vicinity of the third lens unit L3 becomes too large, and a change of the exit pupil distance at the wide-angle end and at the telephoto end becomes large. Therefore, a change of an incident angle at which an off-axis light flux enters a solid-state image sensor becomes large, and it becomes difficult to appropriately correct shading over the entire zoom range. If the share of the magnification is too small with the lower limit of the condition (10) exceeded, the magnification shared by the second lens unit L2 is increased. In this case, if the refractive power of the second lens unit L2 is increased to increase the magnification-varying action, curvatures of field and astigmatism often occur at the wide-angle side.

The condition (11) defines a lens shape factor of the negative lens of the fourth lens unit. If the curvature of the lens surface on the object side becomes too large with the lower limit of the condition (11) exceeded, spherical aberration often occurs over the entire zooms range. When the condition (11) exceeds "1", the fourth lens unit becomes meniscus-shape with a concave surface facing the image side. If the degree of meniscus becomes too large with the upper limit of the condition (11) exceeded, a front principal point position of the fourth lens unit L4 is too close to the image side, and it becomes difficult to ensure the air distance with the third lens unit L3 at the wide-angle end.

The condition (12) defines the total lens length (length from the first lens surface to the image plane) at the wide-angle end. If the total lens length is too long with the upper limit of the condition (12) exceeded, the refractive power of each lens unit is decreased, and the correction of the aberration becomes easier. However, the effective diameter of the lens unit that is away from the aperture stop SP, that is, the effective diameter of the first lens unit L1 is increased. If the total lens length is too short with the lower limit of the condition (12) exceeded, the refractive power of each lens unit becomes too large, and the aberration often occurs. For example, if the refractive power of the first lens unit L1 is too large, spherical aberration often occurs at the telephoto side.

If the refractive power of the second lens unit L2 is too large, curvatures of field often occurs at the wide-angle side and spherical aberrations often occurs at the telephoto side. If the refractive power of the third lens unit L3 is too large, spherical aberration, coma, and axial chromatic aberration often occur over the entire zooms range. If the refractive power of the fourth lens unit L4 is too large, spherical aberration and axial chromatic aberrations often occur over the entire zooms range. If the refractive power of the fifth lens unit L5 is too large, curvature of field often occur over the entire zoom range. It is further desirable to set numeric ranges of the conditions (5) to (12) as follows:

$$-8.0 < M1/fw < -5.0 \tag{5a}$$

$$-2.6 < M2/fw < -0.3 \tag{6a}$$

$$-0.095 < f2/ft < -0.035 \tag{7a}$$

$$0.07 < f3/ft < 0.18 \tag{8a}$$

$$0.12 < f5/ft < 0.27 \tag{9a}$$

$$0.5 < \{(\beta 3t \times \beta 4t \times \beta 5t)/(\beta 3w \times \beta 4w \times \beta 5w)\}/(\beta 2t/\beta 2w) < 1.3 \tag{10a}$$

$$0.3 < (R4a + R4b)/(R4a - R4b) < 1.2 \tag{11a}$$

$$9.0 < TDw/fw < 11.5 \tag{12a}$$

As described above, according to each exemplary embodiment, a zoom lens having a high zoom ratio with a downsized entire zoom lens, an appropriately corrected aberration over the entire zoom range, and high optical performance can be obtained in the five-unit zoom lens having the above-described structure.

Next, an exemplary embodiment of a digital still camera that uses the zoom lens illustrated in each exemplary embodiment as a photographic optical system will be described with reference to FIG. 9. FIG. 9 illustrates a camera body 20 and a photographic optical system 21 including any of the zoom lenses illustrated in the first to fourth exemplary embodiments. A solid-state image sensor (photoelectric conversion element) 22 is mounted in the camera body 20, and is a CCD sensor or a CMOS sensor that receives an object image formed by the photographic optical system 21. A memory 23 stores information corresponding to the object image optically converted by the solid-state image sensor 22.

A viewfinder 24 includes a liquid crystal display panel and the like, and is used to observe an object image formed on the solid-state image sensor 22. As described above, a downsized image pickup apparatus having a high optical performance can be realize by applying the zoom lens according to each exemplary embodiment of the present invention to the image pickup apparatus such as a digital still camera. Further, the zoom lens according to each exemplary embodiment of the present invention can be applied to a single-lens reflex camera without a quick-return mirror.

Next, numerical examples corresponding to the exemplary embodiments of the present invention will be shown. In each numerical example, the order of a surface counted from the object side is represented by "i". In the numerical examples, a radius of curvature of the i-th lens surface from the object side is represented by "ri". The i-th lens thickness or air distance from the object side is represented by "di". A refractive index and Abbe number with respect to d line of glass that is the i-th material from the object side are respectively represented by "ndi" and "vdi".

An aspheric surface shape is expressed by the following expression:

$$X = \frac{(1/R)H^2}{1 + \sqrt{1-(1+K)(H/R)^2}} + A4 \times H^4 + A6 \times H^6 + A8 \times H^8 + A10 \times H^{10} + A12 \times H^{12}$$

where the optical axis direction is an X-axis, a direction perpendicular to the optical axis is an H-axis, a light traveling direction is positive, a paraxial radius of curvature is represented by "R", a conic constant is represented by "K", and aspheric coefficients are represented by "A4", "A6", "A8", "A10", and "A12".

Also, [e+X] indicates [×10$^{+x}$], and [e−X] indicates [×10$^{-x}$].

An air-equivalence of the distance (back focus) from the last lens surface to the paraxial image plane is represented by BF. The total lens length is obtained by adding BF to the distance from the frontmost lens surface to the last lens surface. The aspheric surface is indicated by the mark "*" after the surface number. Also, the relationship between each of the above-described conditions and Numerical examples is set forth in Table 1.

NUMERICAL EXAMPLE 1

| Unit mm | | | | |
|---|---|---|---|---|
| Surface data | | | | |
| Surface number | r | d | nd | vd |
| 1 | 41.396 | 0.80 | 1.84666 | 23.9 |
| 2 | 24.872 | 3.00 | 1.49700 | 81.5 |
| 3 | 529.769 | 0.10 | | |
| 4 | 28.044 | 2.20 | 1.71300 | 53.9 |
| 5 | 137.149 | (Variable) | | |
| 6 | 2506.984 | 0.42 | 1.88300 | 40.8 |
| 7 | 5.554 | 2.90 | | |
| 8 | −19.557 | 0.40 | 1.80400 | 46.6 |
| 9 | 29.885 | 0.10 | | |
| 10 | 11.622 | 1.29 | 1.95906 | 17.5 |
| 11 | 46.749 | (Variable) | | |
| 12* | 8.696 | 1.30 | 1.62263 | 58.2 |
| 13* | −21.805 | 1.65 | | |
| 14(Stop) | ∞ | 0.75 | | |
| 15 | 17.409 | 0.50 | 2.00069 | 25.5 |
| 16 | 8.296 | 0.33 | | |
| 17* | −92.160 | 1.40 | 1.55332 | 71.7 |
| 18* | −9.683 | (Variable) | | |
| 19 | −124.437 | 0.40 | 1.88300 | 40.8 |
| 20 | 24.151 | (Variable) | | |
| 21 | 15.690 | 2.80 | 1.77250 | 49.6 |
| 22 | −28.965 | 0.50 | 1.95906 | 17.5 |
| 23 | −89.958 | (Variable) | | |
| 24 | ∞ | 0.80 | 1.51633 | 64.1 |
| 25 | ∞ | 1.33 | | |
| Image plane | ∞ | | | |

| Aspheric surface data |
|---|
| Twelfth surface |

K = −2.76285e−001    A4 = −4.17389e−005    A6 = 7.15648e−005
A8 = −1.02976e−005   A10 = 6.45194e−007
Thirteenth surface K = 0.00000e+000     A4 = 5.39512e−004     A6 = 8.38651e−005
A8 = −1.42897e−005   A10 = 9.41810e−007
Seventeenth surface K = 0.00000e+000     A4 = 7.94891e−004     A6 = 6.27415e−005
A8 = −2.10515e−005   A10 = 1.50759e−006
Eighteenth surface K = −6.21032e+000    A4 = −5.14792e−004    A6 = 7.07635e−005
A8 = −1.56716e−005   A10 = 9.30629e−007

Various data
Zoom ratio 18.96

| | Wide angle | Intermediate | Telephoto |
|---|---|---|---|
| Focal length | 4.63 | 24.06 | 87.75 |
| F-number | 3.61 | 5.16 | 7.00 |
| Angle of view | 35.76 | 9.15 | 2.53 |
| Image height | 3.33 | 3.88 | 3.88 |
| Total lens length | 50.12 | 64.70 | 77.36 |
| BF | 8.23 | 14.52 | 5.74 |
| d5 | 0.70 | 15.18 | 24.42 |
| d11 | 16.69 | 3.65 | 0.45 |
| d18 | 1.75 | 6.93 | 11.02 |
| d20 | 2.25 | 3.94 | 15.24 |
| d23 | 6.37 | 12.66 | 3.89 |

Zoom lens unit data

| Unit | Beginning surface | Focal length |
|---|---|---|
| 1 | 1 | 38.34 |
| 2 | 6 | −6.09 |
| 3 | 12 | 11.17 |
| 4 | 19 | −24.42 |
| 5 | 21 | 18.21 |
| 6 | 24 | ∞ |

NUMERICAL EXAMPLE 2

| Unit mm | | | | |
|---|---|---|---|---|
| Surface data | | | | |
| Surface number | r | d | nd | vd |
| 1 | 41.396 | 0.80 | 1.84666 | 23.9 |
| 2 | 24.872 | 3.00 | 1.49700 | 81.5 |
| 3 | 529.769 | 0.10 | | |
| 4 | 28.044 | 2.20 | 1.71300 | 53.9 |
| 5 | 137.149 | (Variable) | | |
| 6 | 2506.984 | 0.42 | 1.88300 | 40.8 |
| 7 | 5.554 | 2.90 | | |
| 8 | −19.557 | 0.40 | 1.80400 | 46.6 |
| 9 | 29.885 | 0.10 | | |
| 10 | 11.622 | 1.29 | 1.95906 | 17.5 |
| 11 | 46.749 | (Variable) | | |
| 12* | 8.696 | 1.30 | 1.62263 | 58.2 |
| 13* | −21.805 | 1.65 | | |
| 14(Stop) | ∞ | 0.75 | | |
| 15 | 17.409 | 0.50 | 2.00069 | 25.5 |
| 16 | 8.296 | 0.33 | | |
| 17* | −92.160 | 1.40 | 1.55332 | 71.7 |
| 18* | −9.683 | (Variable) | | |
| 19 | −124.437 | 0.40 | 1.88300 | 40.8 |
| 20 | 24.151 | (Variable) | | |
| 21 | 15.690 | 2.80 | 1.77250 | 49.6 |
| 22 | −28.965 | 0.50 | 1.95906 | 17.5 |
| 23 | −89.958 | (Variable) | | |
| 24 | ∞ | 0.80 | 1.51633 | 64.1 |
| 25 | ∞ | 1.33 | | |
| Image plane | ∞ | | | |

Aspheric surface data
Twelfth surface

K = 7.21454e−001     A4 = −3.04318e−004    A6 = 3.12925e−005
A8 = −9.52299e−007   A10 = 5.44742e−007
Thirteenth surface K = 0.00000e+000     A4 = 4.92584e−004     A6 = 6.28861e−005
A8 = −4.23438e−006   A10 = 8.80236e−007
Seventeenth surface K = 0.00000e+000     A4 = 1.64464e−003     A6 = 1.66400e−004
A8 = −1.34793e−005   A10 = 2.40701e−006
Eighteenth surface K = −9.60867e+000    A4 = −1.37845e−004    A6 = 1.43501e−004
A8 = −5.45282e−006   A10 = 1.61494e−006

-continued

Unit mm

Various data
Zoom ratio 29.12

|  | Wide angle | Intermediate | Telephoto |
|---|---|---|---|
| Focal length | 4.64 | 26.13 | 135.00 |
| F-number | 3.61 | 5.73 | 10.00 |
| Angle of view | 35.72 | 8.43 | 1.64 |
| Image height | 3.33 | 3.88 | 3.88 |
| Total lens length | 51.29 | 67.73 | 83.27 |
| BF | 9.23 | 16.73 | 2.80 |
| d5 | 0.73 | 16.38 | 26.06 |
| d11 | 17.71 | 4.35 | 0.45 |
| d18 | 1.15 | 5.39 | 9.57 |
| d20 | 1.64 | 4.04 | 23.55 |
| d23 | 7.37 | 14.87 | 0.94 |

Zoom lens unit data

| Unit | Beginning surface | Focal length |
|---|---|---|
| 1 | 1 | 39.10 |
| 2 | 6 | −6.03 |
| 3 | 12 | 11.28 |
| 4 | 19 | −22.88 |
| 5 | 21 | 18.86 |
| 6 | 24 | ∞ |

NUMERICAL EXAMPLE 3

Unit mm

Surface data

| Surface number | r | d | nd | νd |
|---|---|---|---|---|
| 1 | 42.706 | 0.80 | 1.84666 | 23.9 |
| 2 | 23.739 | 3.00 | 1.49700 | 81.5 |
| 3 | 342.471 | 0.10 | | |
| 4 | 26.171 | 2.00 | 1.71300 | 53.9 |
| 5 | 213.110 | (Variable) | | |
| 6 | 237.490 | 0.42 | 1.88300 | 40.8 |
| 7 | 5.440 | 3.20 | | |
| 8 | −18.921 | 0.40 | 1.80400 | 46.6 |
| 9 | 46.680 | 0.10 | | |
| 10 | 11.836 | 1.29 | 1.95906 | 17.5 |
| 11 | 37.257 | (Variable) | | |
| 12* | 8.940 | 1.30 | 1.62263 | 58.2 |
| 13* | −21.027 | 1.65 | | |
| 14(Stop) | ∞ | 0.75 | | |
| 15 | 17.664 | 0.50 | 2.00069 | 25.5 |
| 16 | 8.138 | 0.40 | | |
| 17* | −107.353 | 1.40 | 1.55332 | 71.7 |
| 18* | −9.947 | (Variable) | | |
| 19 | −560.775 | 0.40 | 1.88300 | 40.8 |
| 20 | 21.218 | (Variable) | | |
| 21 | 13.896 | 2.30 | 1.77250 | 49.6 |
| 22 | −26.822 | 0.50 | 1.95906 | 17.5 |
| 23 | −98.165 | (Variable) | | |
| 24 | ∞ | 0.80 | 1.51633 | 64.1 |
| 25 | ∞ | 1.33 | | |
| Image plane | ∞ | | | |

Aspheric surface data

Twelfth surface

K = 1.20295e+000   A4 = −3.13497e−004   A6 = 3.30163e−005
A8 = −4.62191e−006  A10 = 5.33639e−007

Thirteenth surface

K = 0.00000e+000   A4 = 5.57248e−004   A6 = 5.10380e−005
A8 = −6.93990e−006  A10 = 7.43809e−007

Seventeenth surface

K = 0.00000e+000   A4 = 1.31763e−003   A6 = 1.18715e−004
A8 = −1.60305e−005  A10 = 1.80456e−006

Eighteenth surface

K = −8.47047e+000  A4 = −2.95153e−004  A6 = 1.25583e−004
A8 = −1.28080e−005  A10 = 1.42877e−006

Various data
Zoom ratio 15.32

|  | Wide angle | Intermediate | Telephoto |
|---|---|---|---|
| Focal length | 4.63 | 24.88 | 71.00 |
| F-number | 3.57 | 5.75 | 7.92 |
| Angle of view | 35.72 | 8.85 | 3.12 |
| Image height | 3.33 | 3.88 | 3.88 |
| Total lens length | 50.94 | 64.81 | 78.18 |
| BF | 9.62 | 12.75 | 5.94 |
| d5 | 0.61 | 13.49 | 20.63 |
| d11 | 17.43 | 4.26 | 1.47 |
| d18 | 1.15 | 12.96 | 21.73 |
| d20 | 1.64 | 0.84 | 7.91 |
| d23 | 7.76 | 10.89 | 4.08 |

Zoom lens unit data

| Unit | Beginning surface | Focal length |
|---|---|---|
| 1 | 1 | 36.56 |
| 2 | 6 | −6.10 |
| 3 | 12 | 11.74 |
| 4 | 19 | −23.15 |
| 5 | 21 | 17.22 |
| 6 | 24 | ∞ |

NUMERICAL EXAMPLE 4

Unit mm

Surface data

| Surface number | r | d | nd | νd |
|---|---|---|---|---|
| 1 | 36.151 | 0.80 | 1.84666 | 23.9 |
| 2 | 22.520 | 3.20 | 1.49700 | 81.5 |
| 3 | 515.629 | 0.10 | | |
| 4 | 26.169 | 2.00 | 1.71300 | 53.9 |
| 5 | 132.397 | (Variable) | | |
| 6 | 391.184 | 0.40 | 1.88300 | 40.8 |
| 7 | 5.455 | 3.00 | | |
| 8 | −18.834 | 0.40 | 1.80400 | 46.6 |
| 9 | 24.814 | 0.10 | | |
| 10 | 11.418 | 1.29 | 1.95906 | 17.5 |
| 11 | 51.209 | (Variable) | | |
| 12* | 8.390 | 1.30 | 1.62263 | 58.2 |
| 13* | −32.244 | 1.10 | | |
| 14(Stop) | ∞ | 1.30 | | |
| 15 | 15.471 | 0.50 | 1.84666 | 23.9 |
| 16 | 6.858 | 0.46 | | |
| 17* | 49.184 | 1.40 | 1.55332 | 71.7 |
| 18* | −10.061 | (Variable) | | |
| 19 | −228.017 | 0.40 | 1.88300 | 40.8 |
| 20 | 30.607 | (Variable) | | |

-continued

Unit mm

| | | | | |
|---|---|---|---|---|
| 21 | 15.069 | 2.50 | 1.77250 | 49.6 |
| 22 | −49.627 | 0.50 | 1.92286 | 18.9 |
| 23 | −294.250 | (Variable) | | |
| 24 | ∞ | 0.80 | 1.51633 | 64.1 |
| 25 | ∞ | 1.33 | | |
| Image plane | ∞ | | | |

Aspheric surface data

Twelfth surface

K = −3.66538e−001  A4 = −3.98545e−006  A6 = 6.99669e−005
A8 = −8.71255e−006  A10 = 5.68608e−007

Thirteenth surface

K = 0.00000e+000  A4 = 5.34427e−004  A6 = 8.74582e−005
A8 = −1.24782e−005  A10 = 8.26184e−007

Seventeenth surface

K = 0.00000e+000  A4 = 7.93569e−004  A6 = 4.38395e−005
A8 = −1.11448e−005  A10 = 6.07158e−007

Eighteenth surface

K = −8.36986e+000  A4 = −7.24864e−004  A6 = 4.26216e−005
A8 = −3.08174e−006  A10 = −1.50666e−007

Various data
Zoom ratio 19.02

| | Wide angle | Intermediate | Telephoto |
|---|---|---|---|
| Focal length | 4.61 | 21.13 | 87.75 |
| F-number | 3.61 | 5.03 | 7.00 |
| Angle of view | 35.84 | 10.39 | 2.53 |
| Image height | 3.33 | 3.88 | 3.88 |
| Total lens length | 50.49 | 63.82 | 75.97 |
| BF | 7.68 | 13.23 | 5.38 |
| d5 | 0.69 | 12.67 | 21.97 |
| d11 | 16.42 | 4.35 | 0.45 |
| d18 | 1.74 | 6.58 | 9.68 |
| d20 | 3.21 | 6.25 | 17.74 |
| d23 | 5.82 | 11.37 | 3.52 |

Zoom lens unit data

| Unit | Beginning surface | Focal length |
|---|---|---|
| 1 | 1 | 35.00 |
| 2 | 6 | −5.80 |
| 3 | 12 | 11.30 |
| 4 | 19 | −30.54 |
| 5 | 21 | 19.48 |
| 6 | 24 | ∞ |

TABLE 1

| | Numerical Example | | | |
|---|---|---|---|---|
| Condition | 1 | 2 | 3 | 4 |
| Condition (1) | 6.56 | 11.88 | 10.63 | 5.54 |
| Condition (2) | 2.00 | 1.82 | 4.44 | 1.72 |
| Condition (3) | −0.28 | −0.17 | −0.33 | −0.35 |
| Condition (4) | −1.57 | −1.71 | −1.58 | −1.15 |
| Condition (5) | −5.89 | −6.90 | −5.88 | −5.52 |
| Condition (6) | −0.76 | −1.43 | −1.56 | −0.91 |
| Condition (7) | −0.07 | −0.04 | −0.09 | −0.07 |
| Condition (8) | 0.13 | 0.08 | 0.17 | 0.13 |
| Condition (9) | 0.21 | 0.14 | 0.24 | 0.22 |
| Condition (10) | 0.63 | 0.61 | 1.14 | 0.58 |
| Condition (11) | 0.67 | 0.68 | 0.93 | 0.76 |
| Condition (12) | 10.89 | 11.12 | 11.05 | 11.00 |

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-231339 filed Oct. 21, 2011, which is hereby incorporated by reference herein in its entirety.

What is claimed is:

1. A zoom lens comprising, in order from an object side to an image side:
   a first lens unit having a positive refractive power;
   a second lens unit having a negative refractive power;
   a third lens unit having a positive refractive power;
   a fourth lens unit having a negative refractive power; and
   a fifth lens unit having a positive refractive power,
   wherein each of the lens units moves in such a way that, during zooming from a wide-angle end to a telephoto end, a distance between the first lens unit and the second lens unit increases, a distance between the second lens unit and the third lens unit decreases, a distance between the third lens unit and the fourth lens unit increases, and a distance between the fourth lens unit and the fifth lens unit increases, and
   wherein following conditions are satisfied:

$$4.0<(D34t+D45t)/(D34w+D45w)<15.0$$

$$1.0<(D34t-D34w)/fw<6.0$$

$$-0.35 \leq f4/ft<-0.1$$

$$-1.71 \leq f1/f4<-0.5$$

where the distances between the third lens unit and the fourth lens unit at the wide-angle end and at the telephoto end are D34w and D34t, respectively, the distances between the fourth lens unit and the fifth lens unit at the wide-angle end and at the telephoto end are D45w and D45t, respectively, focal lengths of the entire zoom lens at the wide-angle end and at the telephoto end are fw and ft, respectively, and focal lengths of the first lens unit and the fourth lens unit are f1 and f4, respectively.

2. The zoom lens according to claim 1, wherein following condition is satisfied:

$$-10.0<M1/fw<-4.0$$

where a movement distance of the first lens unit during zooming from the wide-angle end to the telephoto end is M1.

3. The zoom lens according to claim 1, wherein following condition is satisfied:

$$-3.0<M2/fw<-0.1$$

where a movement distance of the second lens unit during zooming from the wide-angle end to the telephoto end is M2.

4. The zoom lens according to claim 1, wherein following condition is satisfied:

$$-0.10<f2/ft<-0.03$$

where a focal length of the second lens unit is f2.

5. The zoom lens according to claim 1, wherein following condition is satisfied:

$$0.05<f3/ft<0.20$$

where a focal length of the third lens unit is f3.

6. The zoom lens according to claim 1, wherein following condition is satisfied:

$$0.10<f5/ft<0.30$$

where a focal length of the fifth lens unit is f5.

7. The zoom lens according to claim 1, wherein following condition is satisfied:

$$0.4<\{(\beta 3t\times\beta 4t\times\beta 5t)/(\beta 3w\times\beta 4w\times\beta 5w)\}/(\beta 2t/\beta 2w)<1.5$$

where a lateral magnification of an i-th lens unit, where i=2 to 5, at the wide-angle end is βiw, a lateral magnification of the i-th lens unit at the telephoto end is βit.

8. The zoom lens according to claim 1, wherein the fourth lens unit includes one lens subunit having a negative refractive power, and
wherein following condition is satisfied:

$$0.10<(R4a+R4b)/(R4a-R4b)<1.50$$

where radiuses of curvature of lens surfaces of the lens subunit at the object side and the image side are R4a and R4b, respectively.

9. The zoom lens according to claim 1, wherein following condition is satisfied:

$$8.0<TDw/fw<12.0$$

where a distance on an optical axis from a lens surface closest to the object side to the image plane at the wide-angle end is TDw.

10. The zoom lens according to claim 1, wherein, during zooming from the wide-angle end to the telephoto end, the first lens unit, the third lens unit, and the fourth lens unit move toward the object side, the second lens unit moves along a locus that is convex toward the image side, and the fifth lens unit moves along a locus that is convex toward the object side.

11. An image pickup apparatus comprising:
a zoom lens; and
a solid-state image sensor configured to receive an image formed by the zoom lens
wherein the zoom lens comprises, in order from an object side to an image side:
a first lens unit having a positive refractive power;
a second lens unit having a negative refractive power;
a third lens unit having a positive refractive power;
a fourth lens unit having a negative refractive power; and
a fifth lens unit having a positive refractive power,
wherein each of the lens units moves in such a way that, during zooming from a wide-angle end to a telephoto end, a distance between the first lens unit and the second lens unit increases, a distance between the second lens unit and the third lens unit decreases, a distance between the third lens unit and the fourth lens unit increases, and a distance between the fourth lens unit and the fifth lens unit increases, and
wherein following conditions are satisfied:

$$4.0<(D34t+D45t)/(D34w+D45w)<15.0$$

$$1.0<(D34t-D34w)/fw<6.0$$

$$-0.35\leq f4/ft<-0.1$$

$$-1.71\leq f1/f4<-0.5$$

where the distances between the third lens unit and the fourth lens unit at the wide-angle end and at the telephoto end are D34w and D34t, respectively, the distances between the fourth lens unit and the fifth lens unit at the wide-angle end and at the telephoto end are D45w and D45t, respectively, focal lengths of the entire zoom lens at the wide-angle end and at the telephoto end are fw and ft, respectively, and focal lengths of the first lens unit and the fourth lens unit are f1 and f4, respectively.

* * * * *